(12) United States Patent
Apostolopoulos

(10) Patent No.: US 12,206,693 B1
(45) Date of Patent: *Jan. 21, 2025

(54) GRAPH-BASED DETECTION OF NETWORK SECURITY ISSUES

(71) Applicant: Splunk Inc., San Francisco, CA (US)

(72) Inventor: Georgios Apostolopoulos, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/745,482

(22) Filed: May 16, 2022

Related U.S. Application Data

(63) Continuation of application No. 16/828,812, filed on Mar. 24, 2020, now Pat. No. 11,343,268, which is a continuation of application No. 16/219,852, filed on Dec. 13, 2018, now Pat. No. 10,609,059, which is a continuation of application No. 15/419,959, filed on Jan. 30, 2017, now Pat. No. 10,205,735.

(51) Int. Cl.
| | | |
|---|---|---|
| *H04L 29/06* | (2006.01) | |
| *G06F 16/901* | (2019.01) | |
| *H04L 9/40* | (2022.01) | |

(52) U.S. Cl.
CPC ...... *H04L 63/1425* (2013.01); *G06F 16/9024* (2019.01)

(58) Field of Classification Search
None
See application file for complete search history.

(56) References Cited

U.S. PATENT DOCUMENTS

| | | |
|---|---|---|
| 7,555,523 B1 | 6/2009 | Hartmann |
| 8,555,388 B1 | 10/2013 | Wang et al. |
| 9,015,843 B2 | 4/2015 | Griffin et al. |

(Continued)

FOREIGN PATENT DOCUMENTS

WO   2016163903 A1   10/2016

OTHER PUBLICATIONS

"Palantir Cyber Intelligence: An End-to-End Analysis and Knowledge Management Platform", http://web.archive.org/web/20140821212114/http://www.palantir.com/wp-assets/wp-content/uploads/2014/03/Solution-Overview_palantier-Cyber, Aug. 21, 2014, 2 pages.

(Continued)

*Primary Examiner* — Shin-Hon (Eric) Chen
(74) *Attorney, Agent, or Firm* — Perkins Coie LLP

(57) ABSTRACT

The disclosed techniques relate to a graph-based network security analytic framework to combine multiple sources of information and security knowledge in order to detect risky behaviors and potential threats. In some examples, the input can be anomaly events or simply regular events. The entities associated with the activities can be grouped into smaller time units, e.g., per day. The riskiest days of activity can be found by computing a risk score for each day and according to the features in the day. A graph can be built with links between the time units. The links can also receive scoring based on a number of factors. The resulting graph can be compared with known security knowledge for adjustments. Threats can be detected based on the adjusted risk score for a component (i.e., a group of linked entities) as well as a number of other factors.

20 Claims, 23 Drawing Sheets

(56) References Cited

U.S. PATENT DOCUMENTS

| | | |
|---|---|---|
| 9,027,127 B1 | 5/2015 | Soldo et al. |
| 9,055,012 B2 | 6/2015 | Ehrlich et al. |
| 9,166,999 B1 | 10/2015 | Kulkarni et al. |
| 9,202,052 B1 | 12/2015 | Fang et al. |
| 9,231,962 B1 | 1/2016 | Yen et al. |
| 9,356,950 B2 | 5/2016 | Vissamsetty et al. |
| 9,407,652 B1* | 8/2016 | Kesin .................. H04L 67/535 |
| 9,516,053 B1 | 12/2016 | Muddu et al. |
| 9,558,056 B2* | 1/2017 | Sasturkar .............. G06F 16/285 |
| 9,558,346 B1 | 1/2017 | Kolman et al. |
| 9,729,549 B2* | 8/2017 | Davis .................. H04L 67/535 |
| 9,860,257 B1 | 1/2018 | Kumar et al. |
| 10,009,358 B1* | 6/2018 | Xie ...................... G06F 21/552 |
| 10,015,182 B1* | 7/2018 | Shintre .................. H04L 63/10 |
| 10,069,849 B2 | 9/2018 | Muddu et al. |
| 10,389,738 B2 | 8/2019 | Muddu et al. |
| 10,771,345 B1 | 9/2020 | Louca et al. |
| 2005/0278703 A1 | 12/2005 | Lo et al. |
| 2006/0288415 A1 | 12/2006 | Wong |
| 2010/0241828 A1 | 9/2010 | Yu et al. |
| 2011/0055921 A1 | 3/2011 | Narayanaswamy et al. |
| 2011/0202391 A1 | 8/2011 | Fogel et al. |
| 2012/0041901 A1* | 2/2012 | Zhao ...................... G06N 5/043 706/10 |
| 2012/0180126 A1 | 7/2012 | Liu et al. |
| 2012/0254398 A1 | 10/2012 | Thomas et al. |
| 2013/0133052 A1* | 5/2013 | Davis .................. H04L 63/0861 726/7 |
| 2013/0152057 A1 | 6/2013 | Ke et al. |
| 2013/0191887 A1* | 7/2013 | Davis .................... H04L 63/08 726/5 |
| 2013/0318236 A1 | 11/2013 | Coates et al. |
| 2013/0318604 A1 | 11/2013 | Coates et al. |
| 2014/0074817 A1 | 3/2014 | Neels et al. |
| 2014/0101763 A1 | 4/2014 | Harlacher et al. |
| 2014/0165207 A1 | 6/2014 | Engel et al. |
| 2014/0222997 A1 | 8/2014 | Mermoud et al. |
| 2014/0282871 A1 | 9/2014 | Rowland et al. |
| 2015/0040231 A1 | 2/2015 | Oliphant et al. |
| 2015/0047026 A1 | 2/2015 | Neil et al. |
| 2015/0121518 A1 | 4/2015 | Shmueli et al. |
| 2015/0205954 A1 | 7/2015 | Jou et al. |
| 2015/0229662 A1 | 8/2015 | Hitt et al. |
| 2015/0235154 A1 | 8/2015 | Utschig |
| 2015/0244732 A1 | 8/2015 | Golshan et al. |
| 2015/0256413 A1 | 9/2015 | Du et al. |
| 2015/0341379 A1 | 11/2015 | Lefebvre et al. |
| 2015/0355957 A1 | 12/2015 | Steiner et al. |
| 2015/0373039 A1 | 12/2015 | Wang |
| 2015/0373043 A1 | 12/2015 | Wang et al. |
| 2015/0379083 A1 | 12/2015 | Lang et al. |
| 2015/0379425 A1 | 12/2015 | Dirac et al. |
| 2015/0379428 A1 | 12/2015 | Dirac et al. |
| 2016/0034529 A1 | 2/2016 | Nguyen et al. |
| 2016/0057159 A1 | 2/2016 | Yin et al. |
| 2016/0078361 A1 | 3/2016 | Brueckner et al. |
| 2016/0132787 A1 | 5/2016 | Drevo et al. |
| 2016/0147583 A1* | 5/2016 | Ben Simhon ......... G06F 11/076 714/47.3 |
| 2016/0191559 A1 | 6/2016 | Mhatre et al. |
| 2016/0219066 A1* | 7/2016 | Vasseur ............... H04L 63/1458 |
| 2016/0253232 A1 | 9/2016 | Puri et al. |
| 2016/0269424 A1 | 9/2016 | Chandola et al. |
| 2016/0300142 A1 | 10/2016 | Feller et al. |
| 2016/0321265 A1 | 11/2016 | Cevahir |
| 2016/0330226 A1* | 11/2016 | Chen ...................... H04L 63/14 |
| 2016/0358099 A1 | 12/2016 | Sturlaugson et al. |
| 2016/0358103 A1 | 12/2016 | Bowers et al. |
| 2016/0359872 A1* | 12/2016 | Yadav ................. H04L 63/1408 |
| 2017/0048270 A1 | 2/2017 | Boyadjiev et al. |
| 2017/0063886 A1 | 3/2017 | Muddu et al. |
| 2017/0063887 A1 | 3/2017 | Iliofotou et al. |
| 2017/0063888 A1 | 3/2017 | Zadeh et al. |
| 2017/0063889 A1 | 3/2017 | Iliofotou et al. |
| 2017/0063890 A1 | 3/2017 | Tryfonas et al. |
| 2017/0063894 A1 | 3/2017 | Tryfonas et al. |
| 2017/0063909 A1 | 3/2017 | Tryfonas et al. |
| 2017/0063910 A1 | 3/2017 | Muddu et al. |
| 2017/0063911 A1 | 3/2017 | Muddu et al. |
| 2017/0126712 A1* | 5/2017 | Crabtree ............. H04L 63/1425 |
| 2017/0134415 A1 | 5/2017 | Tryfonas et al. |
| 2017/0192782 A1 | 7/2017 | Valentine et al. |
| 2017/0192872 A1 | 7/2017 | Awad et al. |
| 2017/0279844 A1 | 9/2017 | Bower et al. |
| 2017/0288979 A1 | 10/2017 | Yoshihira et al. |
| 2017/0295193 A1* | 10/2017 | Yang ..................... H04L 41/122 |
| 2017/0324759 A1* | 11/2017 | Puri ..................... G06F 11/3476 |
| 2017/0353480 A1 | 12/2017 | Gao et al. |
| 2018/0027006 A1* | 1/2018 | Zimmermann ..... H04L 63/0227 726/11 |
| 2018/0054452 A1 | 2/2018 | Muddu et al. |
| 2018/0198805 A1 | 7/2018 | Vejman et al. |
| 2018/0219888 A1 | 8/2018 | Apostolopoulos |
| 2018/0219894 A1* | 8/2018 | Crabtree ................ H04L 63/20 |
| 2018/0288079 A1 | 10/2018 | Muddu et al. |
| 2018/0302423 A1 | 10/2018 | Muddu et al. |
| 2018/0351981 A1 | 12/2018 | Muddu et al. |
| 2018/0367551 A1 | 12/2018 | Mudou et al. |
| 2019/0124104 A1 | 4/2019 | Apostolopoulos |
| 2019/0327251 A1 | 10/2019 | Muddu et al. |
| 2020/0021607 A1 | 1/2020 | Muddu et al. |
| 2020/0228558 A1 | 7/2020 | Apostolopoulos |
| 2023/0053182 A1* | 2/2023 | Bertiger ................. H04L 63/10 |
| 2023/0308464 A1* | 9/2023 | Dong ................ H04L 63/1416 726/22 |

OTHER PUBLICATIONS

"Palantir Cybermesh", retrieved online via url: http://web.archive.org/web/20140821212016/http://www.palantir.com/wp-assets/media/capabilites-perspectives/Palantir-Cybermesh.pdf, Aug. 21, 2014, 5 pages.

Palantir Technologies, Product Brochure for "Palantir Cyber," 2013, 9 pages.

Boora, N.K., et al., "Efficient Algorithms for Intrusion Detection", In: Ghosh R.K., Mohanty H. (eds) Distributed computing and Internet Technology; ICDCIT 2004; Lecture Notes in Computer Science, vol. 3347; Springer, Berlin, Heidelberg, 2004, pp. 346-352.

Ranshous, Stephen, et al., "Anomaly detection in dynamic networks: a survey", WIREs Computational Statistics; vol. 7, May/Jun. 2015, pp. 223-247.

\* cited by examiner

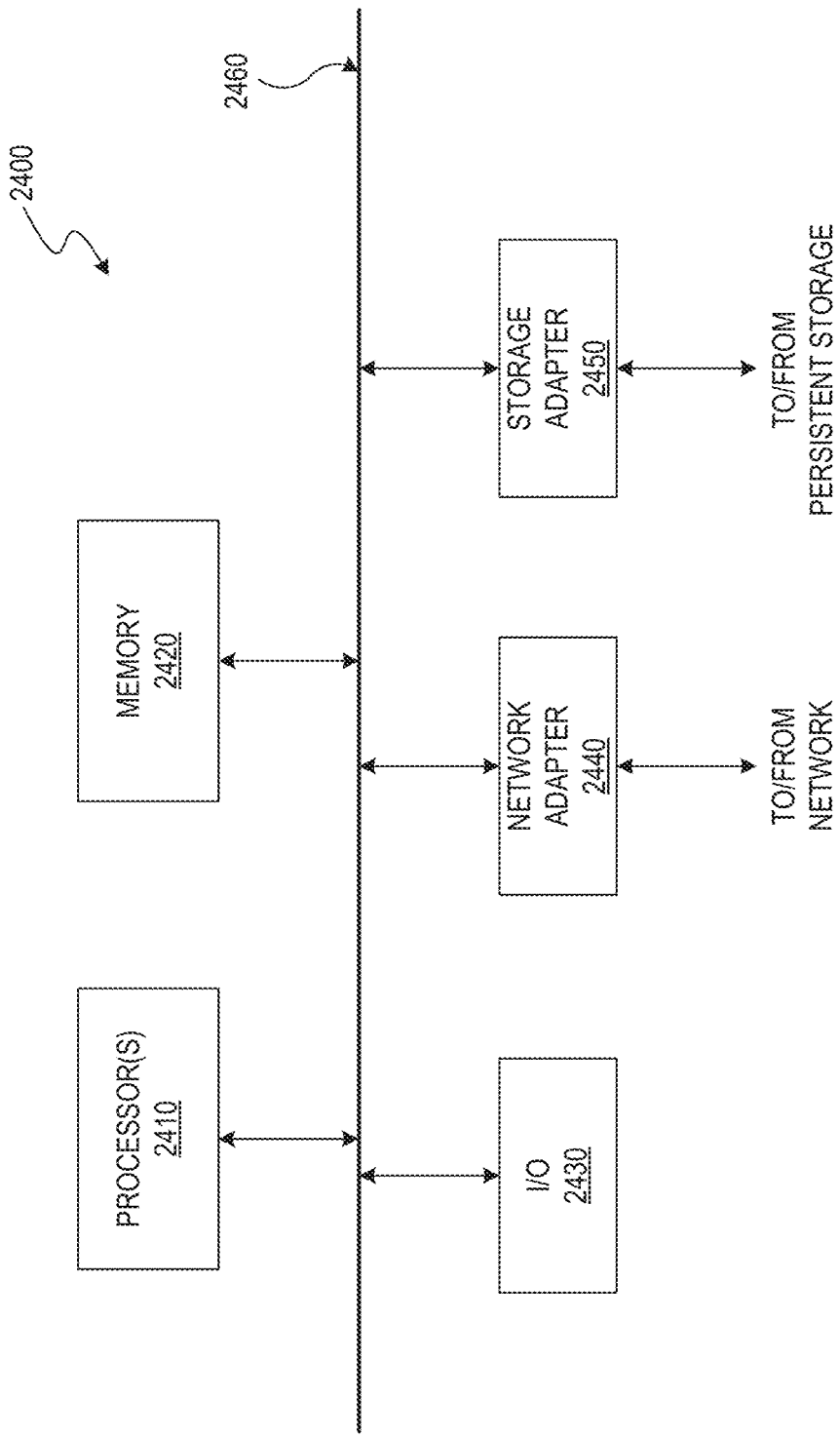

GRAPH-BASED DETECTION OF NETWORK SECURITY ISSUES

PRIORITY ENTITLEMENT

This application is a continuation of U.S. patent application Ser. No. 16/828,812, filed on Mar. 24, 2020, titled "Detection of Network Anomalies Based on Relationship Graphs," which is a continuation of U.S. patent application Ser. No. 16/219,852, filed on Dec. 13, 2018, which issued as U.S. Pat. No. 10,609,059, titled "Graph-Based Network Anomaly Detection Across Time and Entries," which is a continuation of U.S. patent application Ser. No. 15/419,959, filed on Jan. 30, 2017, which issued as U.S. Pat. No. 10,205,735, titled "Graph-Based Network Security Threat Detection Across Time and Entities," which are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least one embodiment of the present disclosure pertains to distributed data processing systems, and more particularly, to intelligence generation and activity discovery from events in a distributed data processing system.

BACKGROUND

Activity detection, both friendly and malicious, has long been a priority for computer network administrators. In known public and private computer networks, users employ devices such as desktop computers, laptop computers, tablets, smart phones, browsers, etc. to interact with others through computers and servers that are coupled to the network. Digital data, typically in the form of data packets, are passed along the network by interconnected network devices.

Malicious activities can cause harm to the network's software or hardware, or its users. Malicious activities may include unauthorized access or subsequent unpermitted use of network resources and data. Network administrators seek to detect such activities, for example, by searching for patterns of behavior that are abnormal or otherwise vary from the expected use pattern of a particular entity, such as an organization or subset thereof, individual user, IP address, node or group of nodes in the network, etc.

Security appliances are used in known systems to provide network security. The appliance approach involves installing security appliances (which are typically servers or computers configured for providing security) at one or more strategic locations in the network. Once installed, the appliance monitors traffic that traverses the network. Functions provided by the appliance may include malware detection, intrusion detection, unauthorized access or unauthorized use of data, among others. However, security appliances cannot easily be scaled to handle temporary or permanent increases in network traffic. Increased network traffic often requires a security vendor to perform an appliance swap or an equally time-consuming appliance upgrade. Appliances also tend to have only limited network visibility because they are typically configured to monitor data traversing the link on which a respective appliance is installed only. Such an appliance will be unaware of activities occurring on other network segments monitored by other appliances and thus cannot use the additional context information pertaining to activities occurring on other network segments to detect a cleverly-designed piece of malware that may be difficult to detect from purely localized information.

Installed software products, rather than security hardware appliances, provide another approach to security for data networks. These products, such as anti-virus or anti-malware software, typically are installed on terminal devices (e.g., desktop and laptop computers, tablets, or smart phones). Data traversing the network between the terminal device is monitored by the installed products to detect malware in either inbound or outbound data. Unfortunately, installed software products also do not perform well in terms of scalability or network visibility. Installed products tend to be disposed locally on the terminal devices and thus also tend to have fairly localized views of the data on the network. They also tend to be installed on hardware that cannot be upgraded easily.

BRIEF DESCRIPTION OF THE DRAWINGS

Certain embodiments of the present disclosure are illustrated, by way of example, in the figures of the accompanying drawings, in which like references indicate similar elements.

FIG. 24 illustrates a block diagram of a computing device that may be used to implement the techniques introduced here.

DETAILED DESCRIPTION

Figure 1:
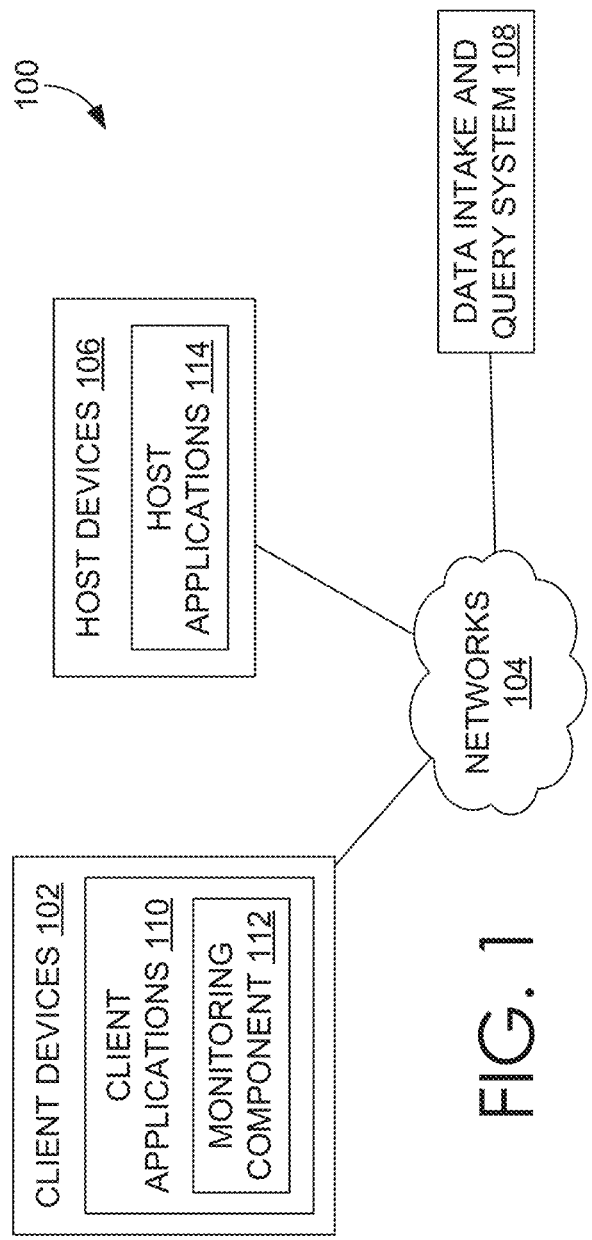
FIG. 1 illustrates a networked computer environment in which a security platform, which is an example application of a data processing system introduced here, may be implemented.

References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

In today's enterprises, attacks by users with trusted access often go undetected by existing security approaches. Indeed, traditional security products often suffer from several major drawbacks, including the inability to detect unknown threats and insider threats, and the inability to scale and process huge amount of data. Whether access is obtained by using compromised accounts/systems or by leveraging existing privileges to conduct malicious activities, nowadays attackers often do not need to employ additional malware. The patterns of these malicious activities vary dynamically, and attackers can almost always find ways to evade traditional security technologies, such as rules-driven malware detection, malicious file signature comparison, and sandboxing. Also, as the amount of the data increases, using human analysis to perform threat detection becomes increasingly expensive and time prohibitive and such human analysis does not allow the threat to be responded to in a timely and effective manner. Further, security analysts such as network administrators often use a "kill chain" methodology to identify and stop the progression of malicious activities (e.g., from intrusion to lateral movement, and to exfiltration). These analysts need supporting evidence to make educated decisions in the kill chain, but traditional security products generally do not provide the support for such methodology.

Introduced here, therefore, is a data processing and analytics system (and, as a particular example, a network security platform) that employs a variety of techniques and mechanisms for anomalous activity detection in a networked environment in ways that are more insightful and scalable than the conventional techniques. As is described in more detail below, the security platform is "big data" driven and employs a number of machine learning mechanisms to perform security analytics. More specifically, the security platform introduced here can perform user behavioral analytics (UBA), or more generally user/entity behavioral analytics (UEBA), to detect the security related anomalies and threats, regardless of whether such anomalies and threats are previously known or unknown. Additionally, by presenting analytical results scored with risk ratings and supporting evidence, the security platform can enable network security administrators or analysts to respond to a detected anomaly or threat, and to take action promptly.

The behavioral analytics techniques introduced here enable the security platform to detect advanced, hidden and insider threats. As one aspect of this disclosure, the behavior analytics leverage machine learning data processing procedures and do not require any preexisting knowledge such as known signatures or rules. The security platform can also improve threat detection and targeted response by using a variety of threat indicators. Further, the security platform supplies supporting evidence within context of the kill chain to enable targeted remediation of any detected anomaly or threat.

One or more embodiments of the disclosed techniques relate to a graph-based network security analytic framework to combine multiple sources of information and security knowledge in order to detect risky behaviors and potential threats. Specifically, at least one technique includes, splitting user activity into smaller units, e.g., daily activity. The user activity can include both anomalies (e.g., alarms) or other non-anomalous activity (e.g., number of bytes transferred). Various features (or risk factors) that capture how risky the underlying activity is can be defined, and a group of the riskiest days of activity can be found. This can be done, for example, by computing a risk score for each day and taking a threshold, or by clustering the days and selecting clusters with higher risks. Thereafter, a graph can be built with links between the time units. The links can also receive scoring based on a number of factors. The resulting graph can be compared with known security knowledge for adjustments. Threats can be detected based on the adjusted risk score for a component (i.e., a group of linked entities) as well as a number of other factors.

As is discussed in more detail below, the embodiments are particularly advantageous in detecting patterns of risky activity that spans across multiple days and/or multiple entities (e.g., users or devices).

General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device. In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the FIG.) in which a value is stored. This field indicates a network latency measurement associated with one or more network requests. The data record may include a "state" field to store a value indicating a state of a network connection, and so forth for any number of aspects of collected performance data.

Data Server System

Figure 2:
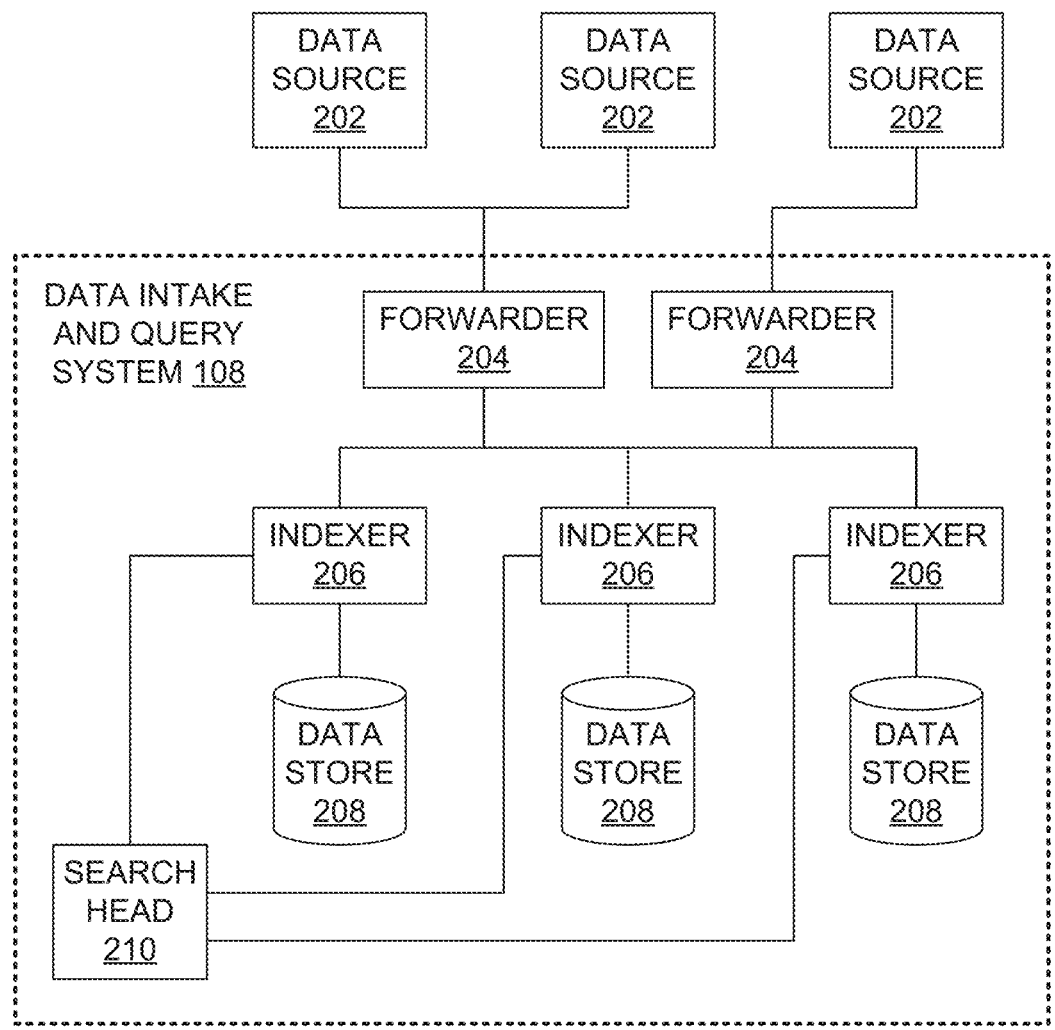
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

Data Ingestion

Figure 3:
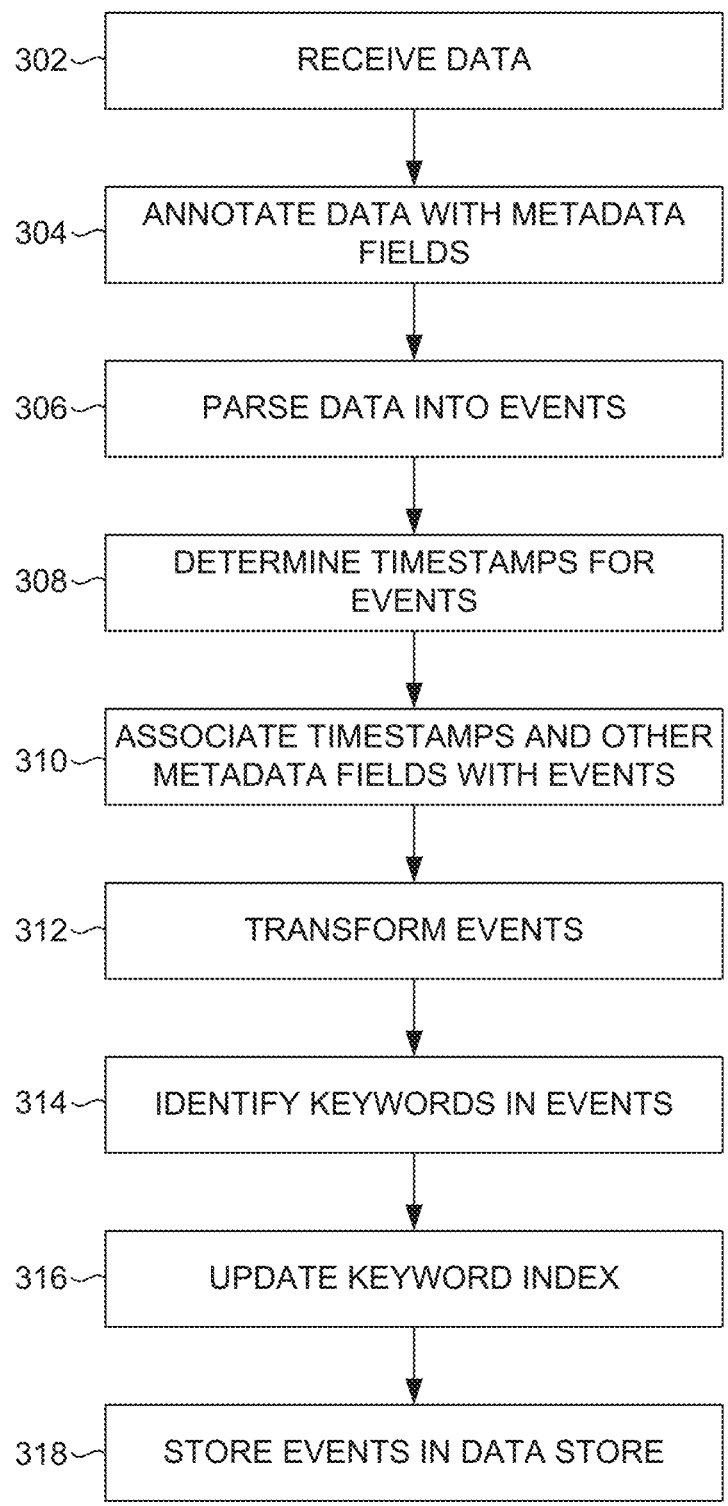
FIG. 3 illustrates a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event.

These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "Site-Based Search Affinity", filed on 30 Apr. 2014, and in U.S. patent application Ser. No. 14/266,817, entitled "Multi-Site Clustering", also filed on 30 Apr. 2014, each of which is hereby incorporated by reference in its entirety for all purposes.

Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 4:
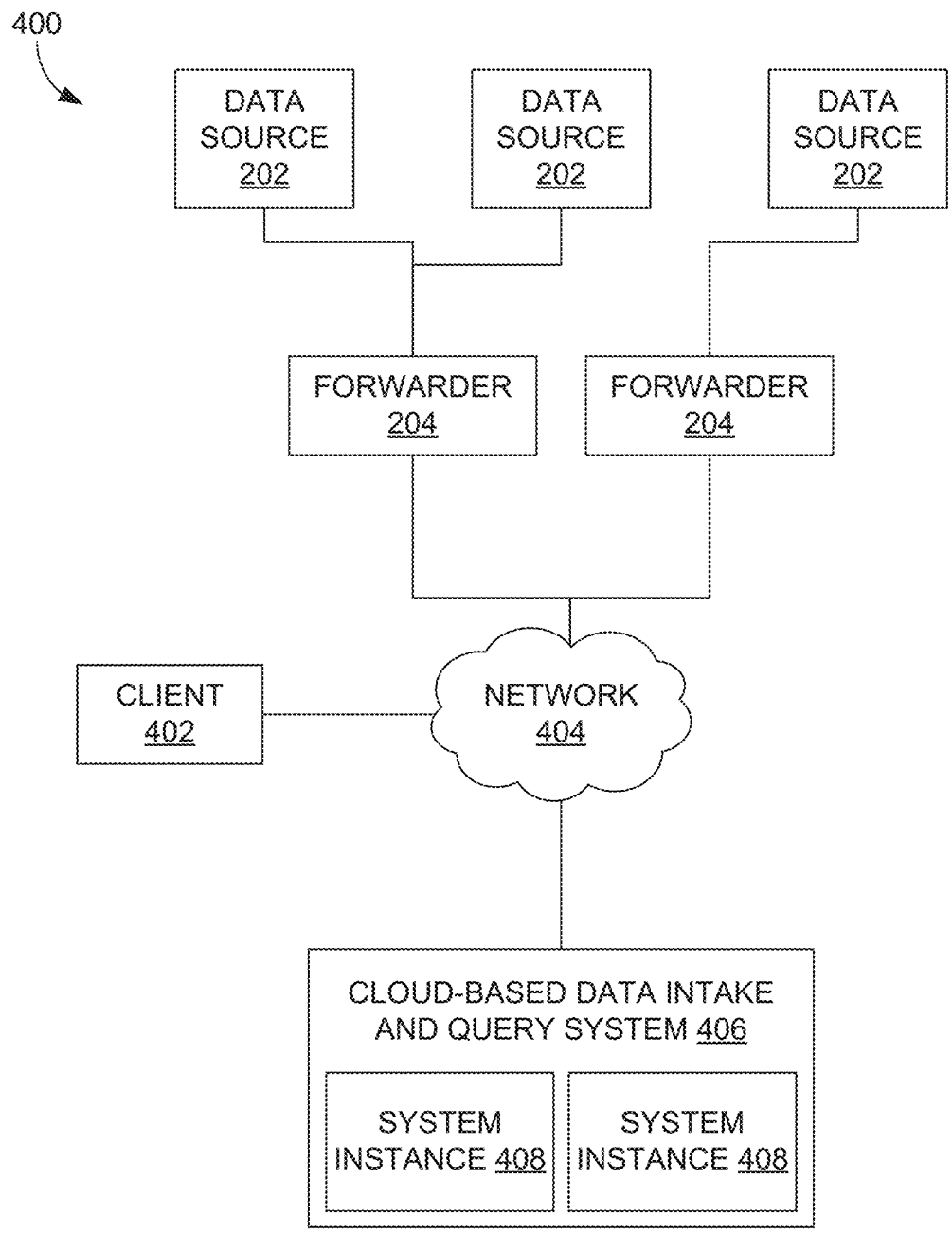
FIG. 4 illustrates a block diagram of an example cloud-based data intake and query system in which an embodiment may be implemented.

FIG. 4 illustrates a block diagram of an example cloud-based data intake and query system. Similar to the system of FIG. 2, the networked computer system 400 includes input data sources 202 and forwarders 204. These input data sources and forwarders may be in a subscriber's private computing environment. Alternatively, they might be directly managed by the service provider as part of the cloud service. In the example system 400, one or more forwarders 204 and client devices 402 are coupled to a cloud-based data intake and query system 406 via one or more networks 404. Network 404 broadly represents one or more LANs, WANs, cellular networks, intranetworks, internetworks, etc., using any of wired, wireless, terrestrial microwave, satellite links, etc., and may include the public Internet, and is used by client devices 402 and forwarders 204 to access the system 406. Similar to the system of 108, each of the forwarders 204 may be configured to receive data from an input source and to forward the data to other components of the system 406 for further processing.

In an embodiment, a cloud-based data intake and query system 406 may comprise a plurality of system instances 408. In general, each system instance 408 may include one or more computing resources managed by a provider of the cloud-based system 406 made available to a particular subscriber. The computing resources comprising a system instance 408 may, for example, include one or more servers or other devices configured to implement one or more forwarders, indexers, search heads, and other components of a data intake and query system, similar to system 108. As indicated above, a subscriber may use a web browser or other application of a client device 402 to access a web portal or other interface that enables the subscriber to configure an instance 408.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 408) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK® CLOUD™ are centrally visible).

Network Security Anomaly and Threat Detection

In today's enterprises, attacks by users with trusted access often go undetected by existing security approaches. Therefore, the capability of above-described data processing and analytics system provides a uniquely powerful tool for implementing a network security detection and monitoring platform that employs a variety of techniques and mechanisms for anomalous activity detection in a networked environment in ways that are more insightful and scalable than the conventional techniques.

In the following description, the example of a security platform is used, for illustrative purposes only, to explain various techniques that can be implemented by the data processing system. Note, however, that the techniques introduced here are not limited in applicability to security applications, security information and event management (SIEM) applications, or to any other particular kind of application. For example, at least some of the techniques introduced here can be used for automated fraud detection and other purposes, based on machine data. Additionally, the techniques introduced here are not limited to use with security-related anomaly and threat detection; rather, the techniques can be employed with essentially any suitable behavioral analysis (e.g., fraud detection or environmental monitoring) based on machine data. In general, "machine data" can include performance data, diagnostic information and/or any of various other types of data indicative of performance or operation of equipment (e.g., an action such as upload, delete, or log-in) in a computing system, as described further below. In general, "machine data" as used herein includes time-stamped event data, as discussed further below. Examples of components that may generate machine data from which events can be derived include: web servers, application servers, databases, firewalls, routers, operating systems, and software applications that execute on computer systems, mobile devices, sensors, Internet of Things (IoT) devices, etc. The data generated by such data sources can include, for example, server log files, activity log files, configuration files, messages, network packet data, performance measurements, sensor measurements, etc., which are indicative of performance or operation of a computing system in an information technology (IT) environment.

The security platform introduced here is capable of handling large volumes of data, particularly machine data, from multiple data sources. These data sources may have different data formats and may provide data at very high data rates (e.g., gigabytes of data per second or more). In some embodiments, incoming data is processed using machine learning/data science techniques to extract knowledge from large volumes of data that are structured or unstructured. In a general sense, data science is a continuation and expansion of the field of data mining and predictive analytics, also known as knowledge discovery and data mining (KDD).

The security platform may be cloud-based and may employ big data techniques to process a vast quantity of high data rate information in a highly scalable manner. In certain embodiments, the security platform may be hosted in the cloud and provided as a service. In certain embodiments, the security platform is provided as a platform-as-a-service (PaaS). PaaS is a category of cloud computing services enabling customers to develop, run and manage Web applications without the complexity of building and maintaining the infrastructure typically associated with developing and launching such applications. PaaS can be delivered in at least two ways, namely: (i) as a public cloud service from a provider, wherein the consumer controls software deployment and configuration settings and the provider provides the networks, servers, storage devices and other services to host the consumer's application, or (ii) as software installed in private data centers or public infrastructure and managed by internal information technology (IT) departments.

Machine learning is employed in certain embodiments to make it unnecessary to know in advance what activity constitutes a security threat or a security threat signature. For example, a security threat may be discovered from the event data as the events occur even though that threat has not been seen before and no signature for that threat existed previously.

In various embodiments discussed herein, security threats are examples of a type of activity to be detected. It should be understood, however, that the security platform and techniques introduced here can be applied to detect any type of unusual or anomalous activity involving data access, data transfer, network access, and network use regardless of whether security is implicated or not.

In this description the term "event data" refers to machine data related to activity on a network with respect to an entity of focus, such as one or more users, one or more network nodes, one or more network segments, one or more applications, etc. In certain embodiments, incoming event data from various data sources is evaluated in two separate data paths: (i) a real-time processing path and (ii) a batch processing path. Preferably, the evaluation of event data in these two data paths occurs concurrently. The real-time processing path is configured to continuously monitor and analyze the incoming event data (e.g., in the form of an unbounded data stream) to uncover anomalies and threats. To operate in real-time, the evaluation is performed primarily or exclusively on event data pertaining to current events contemporaneously with the data being generated by and/or received from the data source(s). In certain embodiments, the real-time processing path excludes historical data (i.e., stored data pertaining to past events) from its evaluation. Alternatively, in an embodiment, the real-time processing path excludes third-party data from the evaluation in the real-time processing path. These example types of data that are excluded from the real-time path can be evaluated in the batch processing path.

In this description the term "event" is sometimes used synonymously with the term "event data" to mean a discrete set of machine data that represents or corresponds to a specific network activity, although "event" can also refer to the underlying activity itself, as will be apparent from context.

Also in this description, an "anomaly" is a detected variation from an expected pattern of behavior on the part of an entity, which variation may or may not constitute a threat. An anomaly represents an event of possible concern, which may be actionable or warrant further investigation. An anomaly is an observable or detectable fact, or data representing such fact. An anomaly or a set of anomalies may be evaluated together and may result in a determination of a threat indicator or a threat. A threat is an interpretation of one or more anomalies and/or threat indicators. Threat indicators and threats are escalations of events of concern. As an example of scale, hundreds of millions of packets of incoming event data from various data sources may be analyzed to yield 100 anomalies, which may be further analyzed to yield 10 threat indicators, which may again be further analyzed to yield one or two threats. This manner of data scaling is one of the reasons the security platform can provide anomaly and threat detection in a real-time manner.

In the context of machine-learning evaluation, historical data and third-party data may be used to create and improve the machine learning models employed to perform the evaluation; however, the amount of such historical data and/or third-party data can be potentially much larger than the real-time data stream. As such, the actual evaluation of the historical data tends to be slower. Consequently, in certain embodiments, the real-time processing path does not use either or both the historical data and third-party data as inputs. In other embodiments, historical and third-party data may be used as inputs but the majority of the data used for evaluation in the real-time processing path still pertains to contemporaneous incoming event data. This is a consequence of the need to process the voluminous incoming event data quickly to obtain actionable threat information to prevent imminent harm.

The anomalies and threats detected by the real-time processing path may be employed to automatically trigger an action, such as stopping the intrusion, shutting down network access, locking out users, preventing information theft or information transfer, shutting down software and or hardware processes, and the like. In certain embodiments, the discovered anomalies and threats may be presented to a network operator (e.g., a network security administrator or analyst) for decision. As an alternative or in addition to automatically taking action based on the discovered anomalies and threats, the decisions by the user (e.g., that the anomalies and threats are correctly diagnosed, or that the discovered anomalies and threats are false positives) can then be provided as feedback data in order to update and improve the models.

In the batch processing path, historical data and third-party data are processed, optionally with the incoming real-time event data, to uncover, for example, more subtle anomalies and threats than the real-time processing path can uncover because of the real-time processing path's responsive time constraints. Batch processing may occur synchronously with real-time processing or in accordance with a predefined schedule.

Historical data represents past events and may include data from different instantiations of the real-time evaluators deployed in different locations in the network. The historical data may span time and geography. In some implementations, only an abridged version of the incoming event data is analyzed in the real-time processing path while a more complete version is stored as historical data. Thus, the historical data may, in one or more of these implementations, include event data that has more attributes than the abridged event data presented to the real-time processing path for evaluation.

As in the real-time data path, anomalies, threat indicators and threats discovered by the batch analyzer may be actionable automatically or may be presented to a human operator for decision on whether to take action. The action taken by the operator to validate or invalidate the conclusions reached by the batch analyzer may serve as a source of feedback to the security platform to improve its evaluation of subsequently processed data.

Network Security Platform Architecture

Figure 5:
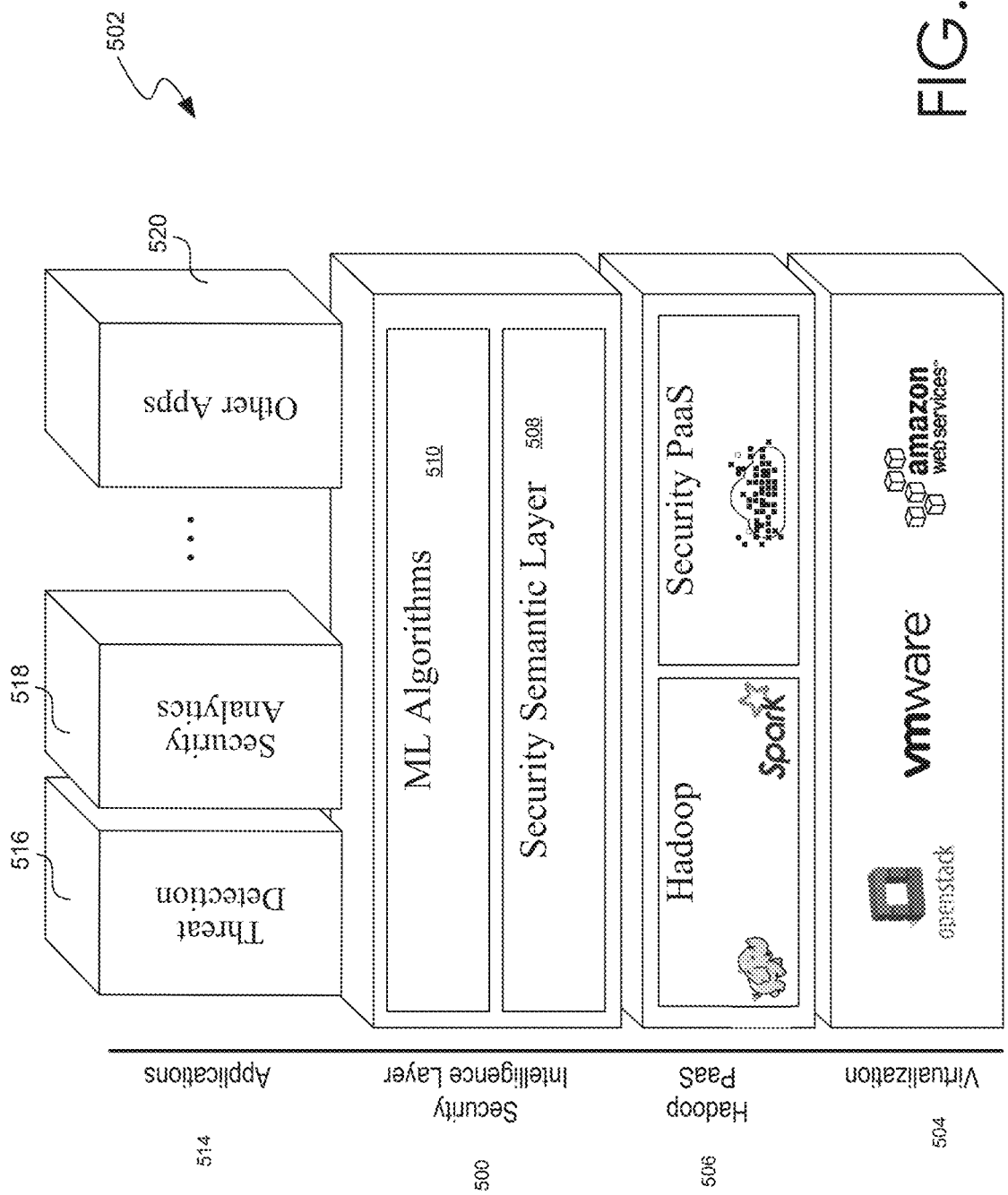
FIG. 5 illustrates an example of functional layers of a security platform.

FIG. 5 illustrates a high level view of an example security platform. In FIG. 5, a cloud computing infrastructure is shown, represented in part by a virtualization layer 504. Various cloud computing operating systems or platforms, such as OpenStack®, VMware®, Amazon Web Services®, or Google Cloud™ may be employed in virtualization layer 504 to create public clouds or private clouds. Generally speaking, these cloud computing operating systems and others permit processing and storage to be implemented on top of a set of shared resources. Among its many advantages, cloud computing permits or facilitates redundancy, fault tolerance, easy scalability, low implementation cost and freedom from geographic restrictions. The concept of cloud computing and the various cloud computing operating systems or infrastructures are known.

Above the virtualization layer 504, a software framework layer 506 implements the software services executing on the virtualization layer 504. Examples of such software services include open-source software such as Apache Hadoop®, Apache Spark™, and Apache Storm™ Apache Hadoop® is an open-source software framework for distributed storage and distributed processing of very large data sets on computer clusters built from commodity hardware. Apache Storm™ is a distributed real-time computation engine that processes data stream record-by-record. Apache Spark™ is a large-scale data processing engine that collects events together for processing in batches. These are only examples of software that may be employed to implement the software framework layer 506.

A security intelligence layer 500 implements a security semantic layer 508 and a machine learning layer 510. The security semantic layer 508 performs the extract, transform, and load (ETL) functions that prepare the incoming event data for further processing by downstream consumers. Note that the term ETL here is used in an illustrative sense to facilitate understanding, as the ETL stage described herein may include functionality in addition to or different from traditional ETL techniques. The machine learning layer 510 represents one of the consumers of the data output of the security semantic layer 508. In an example, event data may be received by the security semantic layer 508, and prepared (or "pre-processed") to be further processed by the machine learning layer 510.

Above the security intelligence layer 500 is an application layer 514. The application layer 514 represents the layer in which application software modules may be implemented. In an example, the output of the machine learning layer 510 includes anomalies, threat indicators, and/or threats. This output may be analyzed by the various applications such as a threat detection application 516, a security analytics application 518 or other applications 520. These layers, modules and their operation will be discussed in greater detail below.

Figure 6:
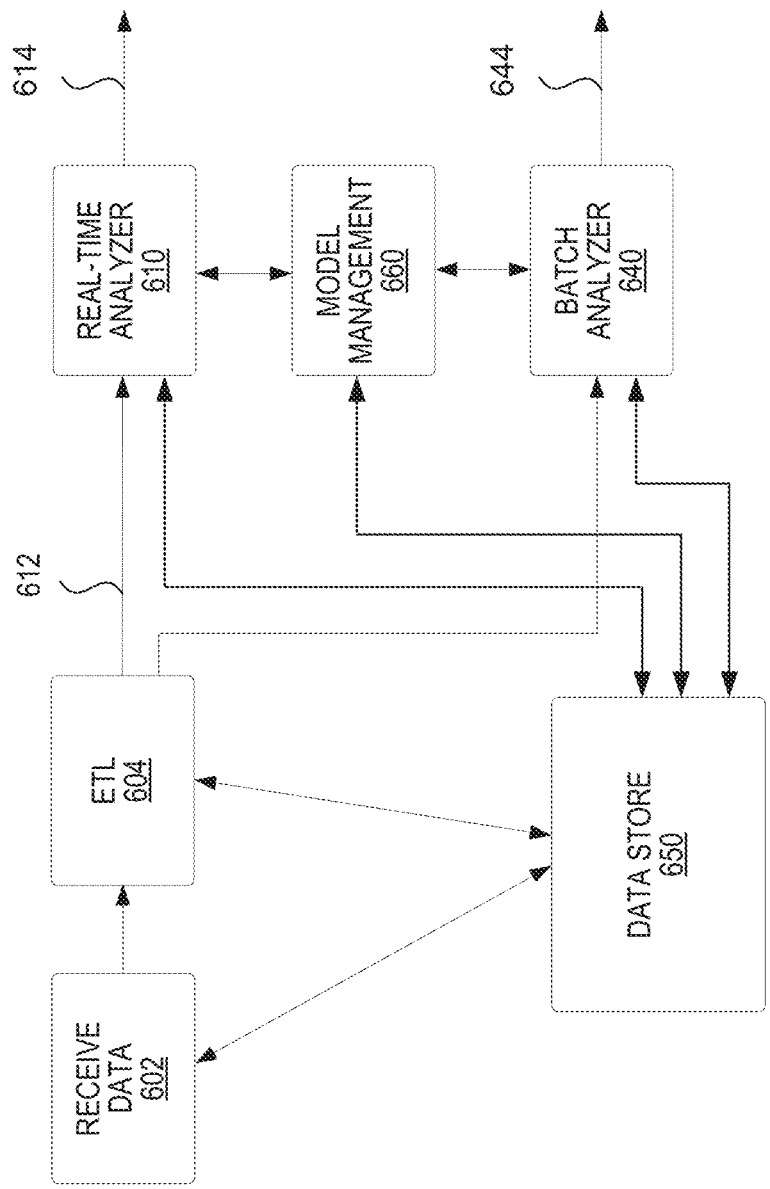
FIG. 6 illustrates a high-level view of an example of the processing within the security platform.

FIG. 6 shows a high-level conceptual view of the processing within security platform 502 in FIG. 5. A receive data block 602 represents a logical component in which event data and other data are received from one or more data sources. In an example, receive data block 602 includes application programming interfaces (APIs) for communicating with various data sources. An ETL block 604 is the data preparation component in which data received from the receive data block 602 is pre-processed, for example, by adding data and/or metadata to the event data (a process interchangeably called decoration, enrichment or annotation herein), or otherwise prepared, to allow more effective consumption by downstream data consumers (e.g., machine learning models).

The enriched event data from the ETL block 604 is then provided to a real-time analyzer 610 over a real-time processing path 612 for detecting anomalies, threat indicators and threats. Output 614 from the real-time analyzer 610 is provided for action by the human operator, in certain embodiments. It should be noted that the real-time analyzer 610 operates in real-time by analyzing event data as the event data received by the security platform 502.

The event data from the ETL block 604 is also provided to a batch analyzer 640 over a batch processing path 644 for detecting anomalies, threat indicators and threats. However, while the event data is provided to the real-time analyzer 610 in an unbounded, streaming, record-by-record manner, it is provided to the batch analyzer in the form of batches of event data (i.e., where each batch of event data contains a collection of events that arrived over the batch period). Because the batch analyzer 640 processes data in batch mode instead of in real-time, in addition to the event data that the real-time analyzer 610 receives, the batch analyzer 640 can receive additional historical event data from the security platforms, prior analysis (including the analysis results, the model states, and the supporting data) from the real-time analyzer 610 (e.g., through a model management component 660), or prior analysis from other analyzers (real-time or batch) implemented elsewhere in the same or other networks.

While a machine learning and machine learning models are employed to evaluate and analyze data in certain embodiments, that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc.

Data Intake and Preparation for Network Security

Figure 7:
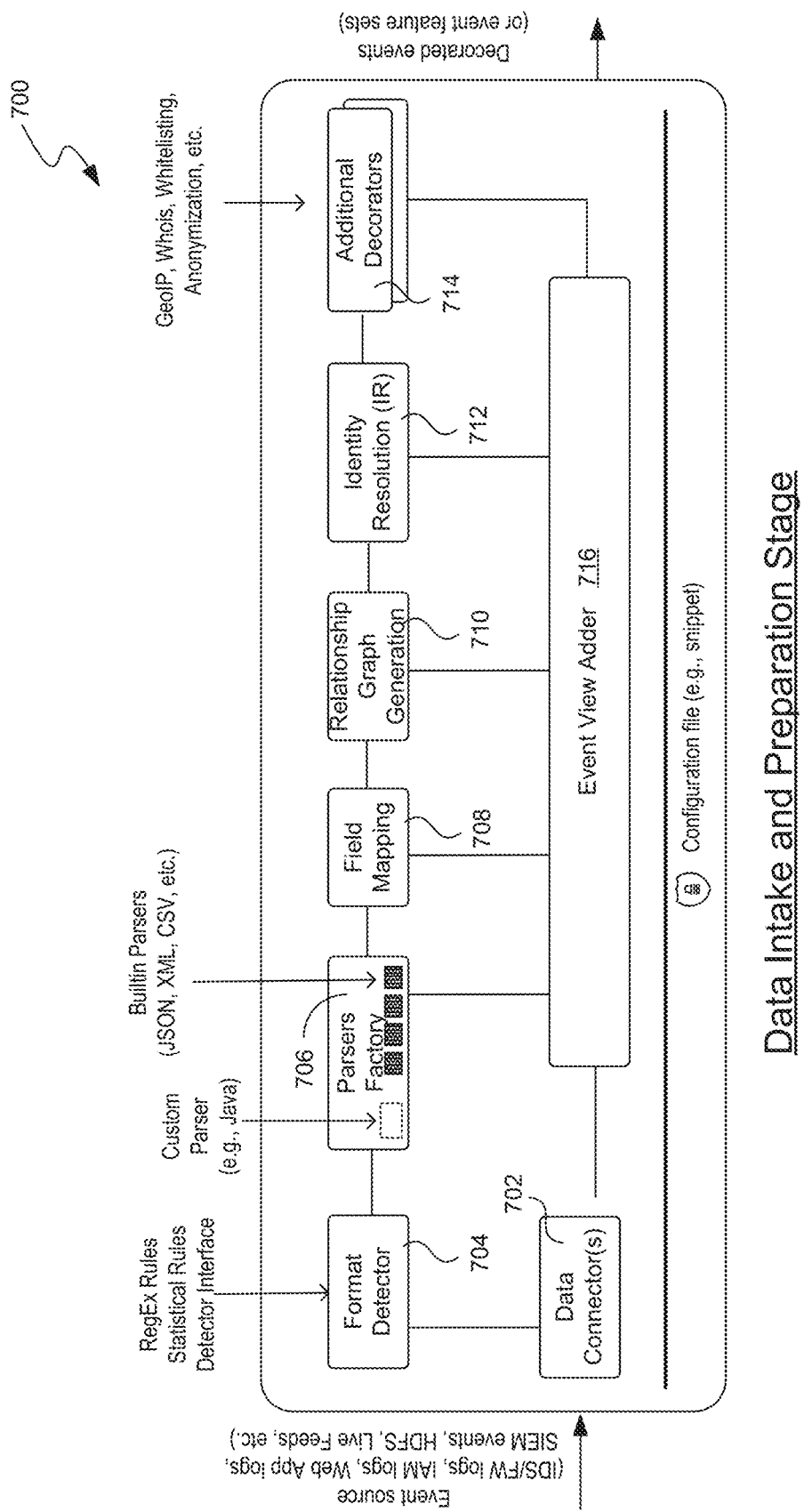
FIG. 7 illustrates an example implementation of the data intake and preparation stage of the security platform.

FIG. 7 shows an example implementation of a data intake and preparation stage 700 of the security platform. The data intake and preparation stage (or engine) 700 can be an implementation of ETL stage 604 in FIG. 6. The data intake and preparation stage 700 can include a number of components that perform a variety of functions disclosed herein. In the example of stage 700, the data intake and preparation stage of the security platform includes a number of data connectors 702, a format detector 704, a number of parsers 706, a field mapper 708, a relationship graph generator 710, an identity resolution module 712, a number of decorators 714, and event view adder 716. These components (e.g., sets of instructions) need not be implemented as separate software programs, procedures or modules, and thus various subsets of these components may be combined or otherwise rearranged in various embodiments. Also, the components shown in FIG. 7 are only one example of the data intake and preparation stage components that can be used by the security platform; the data intake and preparation stage could have more or fewer components than shown, or a different configuration of components.

The various components shown in FIG. 7 can be implemented by using hardware, software, firmware or a combination thereof, including one or more signal processing and/or application specific integrated circuits. The components in the stage 700 are shown arranged in a way that facilitates the discussion herein; therefore, any perceivable sequence in the stage 700 is merely an example and can be rearranged. Any step in the stage 700 may be performed out-of-sequence and/or in parallel to the extent that such rearrangement does not violate the logic dependency of the steps. One or more steps described for the stage 700 may be optional, depending on the deployed environment. The data output from the data intake and preparation stage 700 can also be referred to herein as "decorated events" or "event feature sets." A decorated event includes the raw machine data associated with an event, plus any decoration, enrichment, information, or any other suitable intelligence that is generated based upon or extracted from the event during the data intake and preparation stage. In some embodiments, because of the computationally intensive processes that the data intake and preparation stage may perform, the data intake and preparation engine may be implemented separately from the rest of the stages in the security platform, for example, on a standalone server or on dedicated nodes in a distributed computer cluster.

Various data connectors 702 can be employed by the security platform (e.g., at the data intake stage) to support various data sources. Embodiments of the data connectors 702 can provide support for accessing/receiving indexed data, unindexed data (e.g., data directly from a machine at which an event occurs), data from a third-party provider (e.g., threat feeds such as Norse®, or messages from AWS® CloudTrail®), or data from a distributed file system (e.g., HDFS™). Hence, the data connectors 702 enable the security platform to obtain machine data from various different data sources. Some example categories of such data sources include:

(1) Identity/Authentication: e.g., active directory/domain controller, single sign-on (SSO), human resource management system (HRMS), virtual private network (VPN), domain name system (DNS), or dynamic host configuration protocol (DHCP);
(2) Activity: e.g., web gateway, proxy server, firewall, Netflow™, data loss prevention (DLP) server, file server, or file host activity logs;
(3) Security Products: e.g., endpoint security, intrusion prevention system, intrusion detection system, or antivirus;
(4) Software as a Service (SaaS) or Mobile: e.g., AWS® CloudTrail®, SaaS applications such as Box™ or Dropbox®, or directly from mobile devices; and
(5) External Threat Feeds: e.g., Norse®, ThreatStream®, Financial Services Information Sharing and Analysis Center (FS-ISAC)®, or third-party blacklisted IP/domains.

Depending on the embodiment, external threat feeds may directly feed to the security platform, or indirectly through one or more security products that may be coexisting in the environment within which the security platform is deployed. As used herein, the term "heterogeneous event" refers to the notion that incoming events may have different characteristics, such as different data formats, different levels of information, and so forth. Heterogeneous events can be a result of the events originating from different machines, different types of machines (e.g., a firewall versus a DHCP server), being in a different data format, or a combination thereof.

The data connectors 702 can implement various techniques to obtain machine data from the data sources. Depending on the data source, the data connectors 702 can adopt a pull mechanism, a push mechanism, or a hybrid mechanism. For those data sources (e.g., a query-based system, such as Splunk®) that use a pull mechanism, the data connectors 702 actively collect the data by issuing suitable instructions to the data sources to grab data from those data sources into the security platform. For those data sources (e.g., ArcSight™) that use a push mechanism, the data connectors 702 can identify an input (e.g., a port) for the data sources to push the data into the system. The data connectors 702 can also interact with a data source (e.g., Box™) that adopts a hybrid mechanism. In one embodiment of the data connectors 702 for such hybrid mechanism, the data connectors 702 can receive from the data source a notification of a new event, acknowledge the notification, and at a suitable time communicate with the data source to receive the event.

For those data connectors 702 that may issue queries, the queries can be specifically tailored for real-time (e.g., in terms of seconds or less) performance. For example, some queries limit the amount of the anticipated data by limiting the query to a certain type of data, such as authentication data or firewall related data, which tends to be more relevant to security-related issues. Additionally or alternatively, some queries may place a time constraint on the time at which an event takes place.

Moreover, in some examples, the data connectors 702 can obtain data from a distributed file system such as HDFS™. Because such a system may include a large amount of data (e.g., terabytes of data or more), it is preferable to reduce data movement so as to conserve network resources. Therefore, some embodiments of the data connectors 702 can generate a number of data processing jobs, send the jobs to a job processing cluster that is coupled to the distributed file system, and receive the results from the job processing cluster. For example, the data connectors 702 can generate MapReduce™ jobs, and issue those jobs to a job processing cluster (e.g., YARN™) that is coupled to the distributed file system. The output of the job processing cluster is received back into the security platform for further analysis, but in that case, no or very little raw machine data is moved across the network. The data is left in the distributed file system. In some examples, the generated jobs are user behavior analysis related.

Optionally, after the data connectors 702 obtain/receive the data, if the data format of the data is unknown (e.g., the administrator has not specified how to parse the data), then the format detector 704 can be used to detect the data format of the input data. For example, the format detector 704 can perform pattern matching for all known formats to determine the most likely format of a particular event data. In some instances, the format detector 704 can embed regular expression rules and/or statistical rules in performing the format detection. Some examples of the format detector 704 employ a number of heuristics that can use a hierarchical way to perform pattern matching on complex data format, such as an event that may have been generated and/or processed by multiple intermediate machines. In one example, the format detector 704 is configured to recursively perform data format pattern matching by stripping away a format that has been identified (e.g., by stripping away a known event header, like a Syslog header) in order to detect a format within a format.

However, using the format detector 704 to determine what data format the input data may be at run time may be a time- and resource-consuming process. At least in the cybersecurity space, it is typical that the formats of the machine data are known in advance (e.g., an administrator would know what kind of firewall is deployed in the environment). Therefore, as long as the data source and the data format are specified, the data intake and preparation stage can map the data according to known data formats of a particular event source, without the need of performing data format detection. In certain embodiments, the security platform can prompt (e.g., through a user interface) the administrator to specify the data format or the type of machine(s) the environment includes, and can automatically configure, for example, the parsers 706 in the data intake and preparation stage for such machines.

Further, the security platform provides a way to easily supporting new data format. Some embodiments provide that the administrator can create a new configuration file (e.g., a configuration "snippet") to customize the data intake and preparation stage for the environment. For example, for a particular data source, the configuration file can identify, in the received data representing an event, which field represents a token that may correspond to a timestamp, an entity, an action, an IP address, an event identifier (ID), a process ID, a type of the event, a type of machine that generates the event, and so forth. In other examples (e.g., if a new data format is binary), then the security platform allows an administrator to leverage an existing tokenizer/parser by changing the configuration file, or to choose to implement a new, customized parser or tokenizer.

In a number of implementations, through the configuration file (e.g., snippet), the administrator can also identify, for example, field mappings, decorators, parameters for identity resolution (IR), and/or other parameters of the data intake and preparation stage. The configuration snippet can be monitored and executed by the data intake and preparation engine on the fly to allow the administrator to change how various components in the data intake and preparation engine function without the need to recompile codes and/or restart the security platform.

After receiving the event data by the data connectors 702, the parsers 706 parse the event data according to a predetermined data format. The data format can be specified in, for example, the configuration file. The data format can be used for several functions. The data format can enable the parser to tokenize the event data into tokens, which may be keys, values, or more commonly, key-value pairs. Examples of supported data format include event data output from an active-directory event, a proxy event, an authentication event, a firewall event, an event from a web gateway, a virtual private network (VPN) connection event, an intrusion detection system event, a network traffic analyzer event, or an event generated from a malware engine.

Each parser can implement a set of steps. Depending on what type of data the data intake and preparation stage is currently processing, in some embodiments, the initial steps can include using regular expressions to perform extraction or stripping. For example, if the data is a system log (syslog), then a syslog regular expression can be first used to strip away the packet of syslog (i.e., the outer shell of syslog) to reveal the event message inside. Then, the parser can tokenize the event data into a number of tokens for further processing.

The field mapper 708 can map the extracted tokens to one or more corresponding fields with predetermined meanings. For example, the data format can assist the field mapper 708 to identify and extract entities from the tokens, and more specifically, the data format can specify which of the extracted tokens represent entities. In other words, the field mapper 708 can perform entity extraction in accordance with those embodiments that can identify which tokens represent entities. An entity can include, for example, a user, a device, an application, a session, a uniform resource locator (URL), or a threat. Additionally, the data format can also specify which tokens represent actions that have taken place in the event. Although not necessarily, an action can be performed by one entity with respect to another entity; examples of an action include use, visit, connect to, log in, log out, and so forth. In yet another example, the field mapper 708 can map a value extracted to a key to create a key-value pair, based on the predetermined data format.

The entity extraction performed by the field mapper 704 enables the security platform to gain potential insight on the environment in which the security platform is operating, for example, who the users are, how many users there may be in the system, how many applications that are actually being used by the users, or how many devices there are in the environment.

Event Relationship Discovery

FIGS. 9A and 9B show an example event relationship discovery and recordation technique, which can be implemented in the data intake and preparation stage. To facilitate description, FIGS. 9A and 9B are explained below with reference to FIG. 7. The relationship discovery and recordation technique can be performed by, for example, the relationship graph generator 710. Specifically, after the entities are identified in the tokens, the relationship graph generator 710 is operable to identify a number of relationships between the entities, and to explicitly record these relationships between the entities. Some implementations of the relationship graph generator 710 generate a single relationship graph for each event; such an event-specific relationship graph may also be called a "mini-graph." Further, some implementations incorporate the generated relationship graph into the event data that represents the event, in the form of a data structure representing the relationship graph. A graph in the context of this description includes a number of nodes and edges. Each node in the relationship graph represents one of the entities involved in the event, and each edge represents a relationship between two of the entities. In general, any event involves at least two entities with some relationship between them (e.g., a device and a user who accesses the device) and therefore can be represented as an event-specific relationship graph.

In some implementations, the graph generator 710 can identify a relationship between entities involved in an event based on the actions that are performed by one entity with respect to another entity. For example, the graph generator 710 can identify a relationship based on comparing the action with a table of identifiable relationships. Such a table of identifiable relationship may be customizable and provides the flexibility to the administrator to tailor the system to his data sources (described above). Possible relationships can include, for example, "connects to," "uses," "runs on," "visits," "uploads," "downloads," "successfully logs onto," "restarts," "shuts down," "unsuccessfully attempts to log onto," "attacks," and "infects." Also, the identified relationship between the entities can be indicative of the action, meaning that the identifiable relationship can include the action and also any suitable inference that can be made from the action. For example, an event that records a GET command (which is an action) may indicate that the user is using a machine with a certain IP address to visit a certain website, which has another IP address. In practice, however, the number of identifiable relationships can be directly correlated to the size of the graph, which may impact the security platform's responsiveness and performance. Also, identifiable relationships can include a relationship between entities of the same type (e.g., two users) or entities of different types (e.g., user and device).

In some embodiments, specific details on how to construct the edges and the identifiable relationships are recorded in the configuration file (e.g., snippet). For example, a portion of the configuration file can specify, for the relationship graph generator 710, that an edge is to be created from an entity "srcUser" to another entity "sourceIP," with a relationship that corresponds to an event category to which the event belongs, such as "uses."

Figures 8A, 8B:
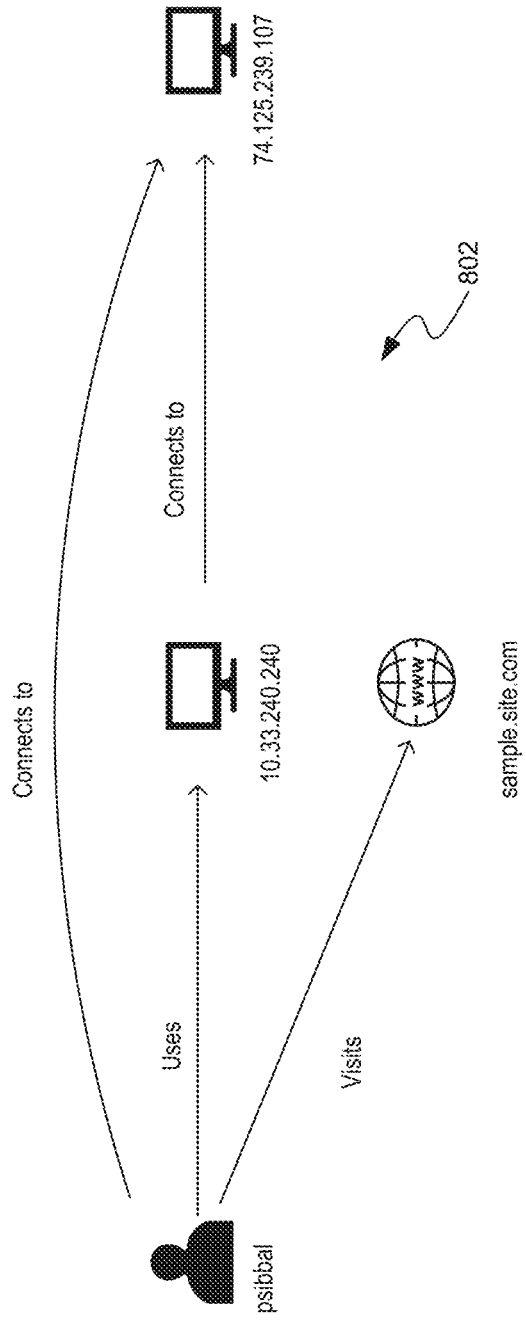
FIG. 8A illustrates raw event data received by the data intake and preparation stage.
FIG. 8B illustrates an event-specific relationship graph based on the event shown in FIG. 8A.

FIG. 8A illustrates raw event data 800 received by the data intake and preparation stage. The raw event data 800, representing an event that occurs, are log data generated by a web gateway server. The web gateway is located where network traffic in and out the environment goes through, and therefore can log the data transfer and web communication from a system inside the environment. The particular event as represented by the event data 800 indicates that, at a particular point of time identified by the timestamp, the user "psibbal" uses the IP address "10.33.240.240" to communicate with an external IP address "74.125.239.107," and transfers 106 bytes of data. The status code of that event is "200," and the event is a TCP event where the HTTP status is "GET." As illustrated, the event data 800 also includes a significant amount of additional information.

Using the aforementioned techniques (e.g., the parsers 706, and the field mapper 708), the graph generator 710 can readily identify that the event represented in the FIG. 8A involves a number of entities, such as the user "psibbal," the source IP "10.33.240.240," the destination IP "74.125.239.107," and a URL "sample.site.com." The graph generator 710 also identifies that an action "GET" is involved in the event. Accordingly, the graph generator 710 can compare the action to the table of identifiable actions, identify one or more relationships between the entities, and create an event-specific relationship graph 802 based on the event. As shown in FIG. 8B, the relationship graph 802 includes the entities that are involved in the events. Each entity is represented by a different node. The relationship graph 802 also includes edges that link the nodes representing entities. The identified relationships between the entities are the edges in the graph 802. The relationship graph 802 can be stored in known data structures (e.g., an array) suitable for representing graphs that have nodes and edges.

Note, however, that the components introduced here (e.g., the graph generator 710) may be tailored or customized to the environment in which the platform is deployed. As described above, if the network administrator wishes to receive data in a new data format, he can edit the configuration file to create rules (e.g., in the form of functions or macros) for the particular data format including, for example, identifying how to tokenize the data, identifying which data are the entities in the particular format, and/or identifying the logic on how to establish a relationship. The data input and preparation stage then can automatically adjust to understand the new data format, identify identities and relationships in event data in the new format, and create event relationship graphs therefrom.

Then, in some embodiments, the graph generator 710 attaches the relationship graph 802 to the associated event data 800. For example, the graph 802 may be recorded as an additional field of the event data 800. In alternative embodiments, the relationship graph 802 can be stored and/or transferred individually (i.e., separate from the event data 800) to subsequent nodes in the security platform. After additional processes (e.g., identity resolution, sessionization, and/or other decorations) in the data intake and preparation stage, the event data 800 including the relationship graph 802 can be sent to a distributed messaging system, which may be implemented based on Apache Kafka®. The messaging system can in turn send the event data 800 to an event processing engine (e.g., a machine learning model execution and analytics engine, such as the complex event processing engine introduced here and described further below) for further processing. As described further below, the event processing engine is operable to use machine learning models to perform analytics based on the events and, in some instances, in conjunction with their associated relationship graphs, to security-oriented anomalies and threats in the environment.

The messaging system (e.g., Apache Kafka®) can also accumulate or aggregate, over a predetermined period of time (e.g., one day), all the relationship graphs that are generated from the events as the events come into the security platform. Particularly, note that certain types of behavioral anomalies and threats can become more readily identifiable when multiple events are compared together, and sometimes such comparison may even be the only way to identify the anomalies and/or threats. For example, a beaconing anomaly happens when there is a device in the network that communicates with a device outside the network in an unexpected and (mostly) periodic fashion, and that anomaly would become more identifiable when relationship graphs associated with all the device's related beacons are combined into a composite relationship graph. As such, at the messaging system, the relationship graphs (mini-graphs) for all events, or at least for multiple events, can be combined into a larger, composite relationship graph. For example, a computer program or a server can be coupled to the messaging system to perform this process of combining individual relationship graphs into a composite relationship graph, which can also be called an enterprise security graph. The composite relationship graph or enterprise security graph can be stored, for example, as multiple files, one file for each of multiple predetermined time periods. The time period depends on the environment (e.g., the network traffic) and the administrator. In some implementations, the composite relationship graph is stored (or "mined" in data mining context) per day; however, the graph mining time period can be a week, a month, and so forth.

In some embodiments, event-specific relationship graphs are merged into the composite relationship graph on an ongoing basis, such that the composite relationship graph continuously grows over time. However, in such embodiments it may also be desirable to remove ("age out") data deemed to be too old, from the composite relationship graph, periodically or from time to time.

In some embodiments, the nodes and edges of the composite graph are written to time namespaces partitioned graph files. Then, each smaller segment can be merged with a master partition (e.g., per day). The merge can combine similar nodes and edges into the same record, and in some embodiments, can increase the weight of the merged entity nodes. Note that the exact order of the events' arrival becomes less important, because even if the events arrive in an order that is not the same as how they actually took place, as long as the events have timestamps, they can be partitioned into the correct bucket and merged with the correct master partition. Some implementations provide that the composite graphs can be created on multiple nodes in a parallelized fashion.

In this manner, this composite relationship graph can include all identified relationships among all identified entities involved in the events that take place over the predetermined period of time. As the number of events received by the security platform increases, so does the size of this composite relationship graph. Therefore, even though a relation graph from a single event may not carry much meaning from a security detection and decision standpoint, when there are enough events and all the relationship graphs from those events are combined into a composite relationship graph, the composite relationship graph can provide a good indication of the behavior of many entities, and the quality/accuracy of this indication increases over time as the composite relationship graph grows. Then, the subsequent processing stages (e.g., the complex processing engine) can use models to perform analytics on the composite relationship graph or on any particular portion (i.e., "projection," discussed further below) of the composite relationship graph. In some embodiments, the composite relationship graph is persistently stored using a distributed file system such as HDFS™.

In some embodiments, when various individual events' relationship graphs (along with their associated decorated events) are stored in the messaging system but have not yet been combined to create the composite relationship graph, each such event's relationship graph can be further updated with any information (e.g., anomalies) that is discovered by downstream processes in the security platform. For example, if an event is found to be an anomalous, then the relationship graph associated with that anomalous event can be updated to include this information. In one example, the individual relationship graph of that anomalous event is revised to include an anomaly node (along appropriate edges), so that when the composite relationship graph is created, it can be used to determine what other entities might be involved or affected by this anomaly.

At least in some embodiments, the composite graph enables the security platform to perform analytics on entity behaviors, which can be a sequence of activities, a certain volume of activities, or can be custom defined by the administrator (e.g., through a machine learning model). By having an explicit recordation of relationships among the events, the relationship graph generator 710 can enable the analytics engines introduced here (e.g., the complex processing engine) to employ various machine learning models, which may focus on different portions or aspects of the discovered relationships between all the events in the environment, in order to detect anomalies or threats.

Complex Event Processing (CEP) Engine

Certain embodiments introduced here include a machine learning-(ML-) based complex event processing (CEP) engine that provides a mechanism to process data from multiple sources in a target computer network to derive anomaly-related or threat-related conclusions in real-time so that an appropriate response can be formulated prior to escalation. A CEP engine is a processing entity that tracks and reliably analyzes and processes unbounded streams of electronic records to derive a conclusion therefrom. An "unbounded stream" in this context is an open-ended sequence of data that is continuously received by the CEP engine. An unbounded stream is not part of a data container with a fixed file size; instead, it is a data sequence whose endpoint is not presently known by the receiving device or system. In a computer security context, a CEP engine can be useful to provide real-time analysis of machine data to identify anomalies.

The ML-based CEP engine described herein enables real-time detection of and response to computer security problems. For example, the input data of the ML-based CEP engine includes event feature sets, where each event feature set corresponds to an observable event in the target computer network.

A conventional CEP engine relies on user-specified rules to process an incoming event to identity a real-time conclusion. User-specified rules benefit from its computational simplicity that makes real-time computation plausible. However, conventional CEP engines rely on people to identify known event patterns corresponding to known conclusions. Accordingly, conventional CEP engines are unable to derive conclusions based on patterns or behaviors that are not previously known to authors of the user-specified rules. Conventional CEP engines do not consider historical events. The added complexity (e.g., memory consumption and processing power requirement) associated with the inclusion of the historical events would likely overtax an otherwise resource-limited computer system that supports a conventional CEP engine.

Certain embodiments introduced here include an ML-based CEP engine that utilizes distributed training and deliberation of one or more machine learning models. "Deliberation" of a machine learning model or a version of a machine learning model involves processing data through a model state of the machine learning model or version of the machine learning model. For example, deliberation can include scoring input data according to a model deliberation process logic as configured by the model state. The ML-based CEP engine processes event feature sets through the ML models to generate conclusions (e.g., security-related anomalies, security-related threat indicators, security-related threats, or any combination thereof) in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond the observed environment. The ML-based CEP engine continuously receives new incoming event feature sets and reacts to each new incoming event feature set by processing it through at least one machine learning model. Because of real-time processing, the ML-based CEP engine can begin to process a time slice of the unbounded stream prior to when a subsequent time slice from the unbounded stream becomes available.

The ML-based CEP engine disclosed herein is advantageous in comparison to conventional CEP engines at least because of its ability to recognize unknown patterns and to incorporate historical data without overburdening the distributed computation system by use of machine learning models. Because the ML-based CEP engine can utilize unsupervised machine learning models, it can identify entity behaviors and event patterns that are not previously known to security experts. In some embodiments, the ML-based CEP engine can also utilize supervised, semi-supervised, and deep machine learning models.

The ML-based CEP engine is further capable of condensing and summarizing historical knowledge by observing streams of events to train the machine learning models. This enables the ML-based CEP engine to include a form of historical comparison as part of its analysis without consuming too much data storage capacity. For example, the ML-based CEP engine can train a decision tree based on the historical events. In this case, the trained decision tree is superior to a user-specified rule because it can make predictions based on historical sequence of events. In another example, the ML-based CEP engine can train a state machine. Not only is the state machine trained based on historical sequences of events, but it is also applied based on a historical sequence of events. For example, when the ML-based CEP engine processes event feature sets corresponding to an entity through the state machine, the ML-based CEP engine can track a number of "states" for the entity. These run-time states (different from a "model state" as used in this disclosure) represent the history of the entity without having to track every historical event involving the entity.

The machine learning models enable the ML-based CEP engine to perform many types of analysis, from various event data sources in various contextual settings, and with various resolutions and granularity levels. For example, a machine learning model in the ML-based CEP engine can perform entity-specific behavioral analysis, time series analysis of event sequences, graph correlation analysis of entity activities, peer group analysis of entities, or any combination thereof. For example, the data sources of the raw event data can include network equipment, application service servers, messaging servers, end-user devices, or other computing device capable of recording machine data. The contextual settings can involve scenarios such as specific networking scenarios, user login scenarios, file access scenarios, application execution scenarios, or any combination thereof. For example, an anomaly detected by the machine learning models in the ML-based CEP engine can correspond to an event, a sequence of events, an entity, a group of entities, or any combination thereof. The outputs of the machine learning models can be an anomaly, a threat indicator, or a threat. The ML-based CEP engine can present these outputs through one or more output devices, such as a display or a speaker.

Examples of entity-specific behavioral analysis include hierarchical temporal memory processes that employ modified probabilistic suffix trees (PST), collaborative filtering, content-based recommendation analysis, statistical matches in whitelists and blacklists using text models, entropy/randomness/n-gram analysis for uniform resource locators (e.g., URLs), other network resource locators and domains (AGDs), rare categorical feature/association analysis, identity resolution models for entities, land speed violation/geo location analysis, or any combination thereof. Examples of time series analysis of event sequences include Bayesian time-series statistical foundation for discrete time-series data (based on variable-memory Markov models and context-tree weighting), dynamic thresholding analysis with periodicity patterns at several scales, change-point detection via maximum-a-posteriori-probability (MAP) modeling, cross-correlation and causality analysis via variable-memory modeling and estimation of directed mutual information, outlier analysis, or any combination thereof.

Examples of graph-based analysis of entity activities include command and control detection analysis, beaconing detector, device, IP, domain and user reputation analysis, lateral movement detector, dynamic fingerprinting for users/devices, or any combination thereof. Examples of peer group analysis of entities include grouping of entities based on similarity and page rank, social-neighborhood graph-based clustering, online distributed clustering, clustering for bipartite and generic graphs, or any combination thereof.

Figure 9:
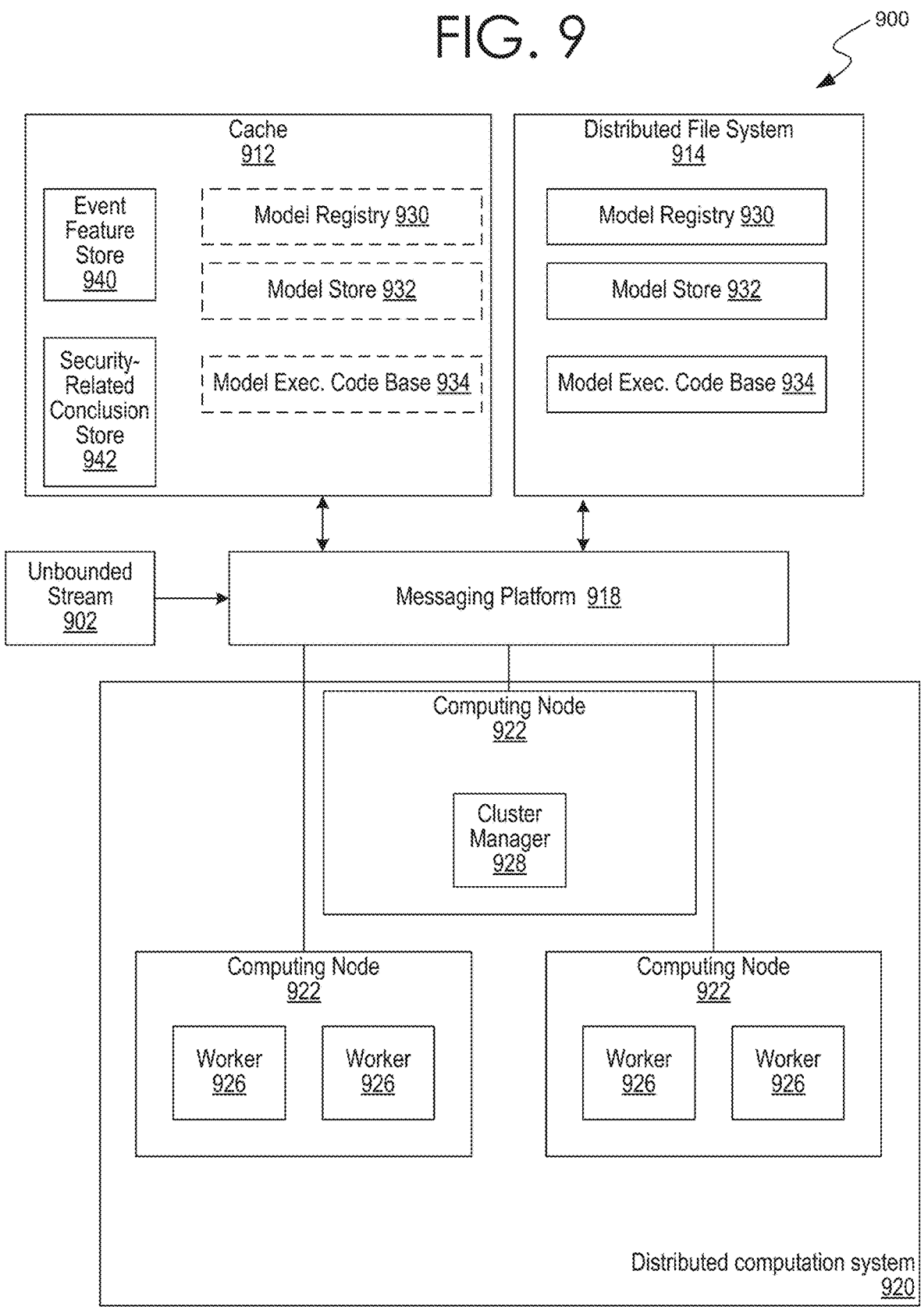
FIG. 9 illustrates a block diagram of a machine learning-based complex event processing (CEP) engine.

FIG. 9 is a block diagram of an ML-based CEP engine 900, in accordance with various embodiments. The ML-based CEP engine 900 receives an unbounded stream 902 of event feature sets as its input. For example, the ML-based CEP engine 900 receives the unbounded stream 902 from the data intake and preparation stage 700 of FIG. 7. Each event feature set corresponds to a machine-observed event. The ML-based CEP engine 900 can train machine learning models using the unbounded stream 902. The ML-based CEP engine 900 can also compute security-related conclusions (e.g., an anomaly, a threat indicator, or a threat as described in this disclosure) by processing at least a subset of the event feature sets (e.g., from the unbounded stream 902) through the machine learning models.

The ML-based CEP engine 900 includes a cache component 912, a distributed filesystem 914, a messaging platform 918, and a distributed computation system 920. The ML-based CEP engine 900 can include other data access systems. For example, the data access systems include a relational database (e.g., a structured query language (SQL) database), a non-relational database (e.g., HBase®), a time series database, a graph database, or any combination thereof. The ML-based CEP engine 900 can include other resource management systems (e.g., a distributed coordination system, such as ZooKeeper™). The cache component 912 can be non-persistent memory (e.g., volatile memory). The cache component 912 can be a distributed cache, such as a cluster-based cache or a peer-to-peer cache. For example, the cache component 912 is implemented in REDIS, an open source key-value cache.

The distributed filesystem 914 stores data on a cluster of computing machines to provide high aggregate bandwidth across the cluster. The distributed filesystem 914 includes at least a name node and a plurality of data nodes. Each data node serves blocks of data over a network using a file access protocol (e.g., block protocol or file-based protocol) specific to the distributed filesystem 914. For example, the distributed filesystem 914 is implemented according to the Apache Hadoop® distributed file system (HDFS™).

The distributed filesystem 914 stores a model registry 930, a model store 932, and a model execution code base 934. In some embodiments, the model execution code base 934 is part of the model registry 930. The model registry 930 stores model type definitions. A model type definition can configure whether a distributed computation system is responsible for a model type and can configure a model training workflow (i.e., a workflow of how to train machine learning models of a model type) and a model deliberation workflow (i.e., a workflow of how to apply machine learning models of a model type) of the model type. The model store 932 stores model states that represent machine learning models or versions of the machine learning models. A model state, described further below, is a collection of numeric parameters in a data structure. A model training process thread produces and updates a model state. A model deliberation process thread is configured by a model state to process event feature sets into security-related conclusions. The model execution code base 934 stores process logics for running model-related process threads. In some embodiments, the model execution code base 934 also stores process logics associated with event views.

In some embodiments, the content of the distributed file system 914 can be shared with another distributed computation system (e.g., a batch data processing engine discussed in various parts of this disclosure). For example, a model state stored in the model store 932 representing a machine learning model or a version of a machine learning model can be shared with the other distributed computation system. For another example, one or more model types in the model registry 930 and the model execution code base 934 can be shared with the other distributed computation system.

The cache component 912 stores an event feature store 940 and a security-related conclusion store 942. The cache component 912 can cache (e.g., the most recently used or most recently received event feature sets) from the unbounded stream 902 in the event feature store 940. The cache component 912 can cache the security-related conclusions (e.g., the most recently produced or the most recently used) in the security-related conclusion store 942. The ML-based CEP engine 900 can compute the security-related conclusions by processing the event feature sets through the machine learning models. In some embodiments, the cache component 912 stores copies or references to entries in the model store 932. In some embodiments, the cache component 912 stores copies or references to entries in the model registry 930. In some embodiments, the cache component 912 stores copies or references to at least a portion of the model execution code base 934.

The messaging platform 918 provides a computer application service to facilitate communication amongst the various system components of the ML-based CEP engine 900 and between external systems (e.g., the data intake and preparation stage) and the ML-based CEP engine 900. For example, the messaging platform 918 can be Apache Kafka®, an open-source message broker utilizing a publish-subscribe messaging protocol. For example, the messaging platform 918 can deliver (e.g., via self-triggered interrupt messages or message queues) the event feature sets from the unbounded stream 902 to model-related process threads (e.g., one or more of model training process threads, model deliberation process threads, and model preparation process threads) running in the distributed computation system 920. The messaging platform 918 can also send data within the cache component 912 or the distributed filesystem 914 to the model-related process threads and between any two of the model-related process threads.

For the ML-based CEP engine 900, the distributed computation system 920 is a real-time data processing engine. The distributed computation system 920 can be implemented on the same computer cluster as the distributed filesystem 914. In some embodiments, an ML-based batch processing engine runs in parallel to the ML-based CEP engine. In those embodiments, the ML-based batch processing engine can implement a distributed computation system configured as a batch processing engine (e.g., using a data parallelism architecture). The system architecture of the ML-based batch processing engine can be identical to the ML-based CEP engine 900, except for the distributed computing platform engine running on the distributed computation system, and the ML-based batch processing engine's inputs including batch data containers of event feature sets (instead of an unbounded stream of incoming event feature sets).

The distributed computation system 920 can be a distributed computation cluster. The distributed computation system 920 coordinates the use of multiple computing nodes 922 (e.g., physical computing machines or virtualized computing machines) to execute the model-related process threads. The distributed computation system 920 can parallelize the execution of the model-related process threads. The distributed computation system 920 can implement a distributed resource manager (e.g., Apache Hadoop® YARN™) and a real-time distributed computation engine (e.g., Storm™ or Spark™ Streaming) to coordinate its computing nodes 922 and the model-related process threads running thereon. The real-time distributed computation engine can be implemented based on a task parallel architecture. In an alternative embodiment, the real-time distributed computation engine can be implemented based on a data-parallel architecture.

Each computing node 922 can implement one or more computation workers (or simply "workers") 926. A computation worker is a logical construct of a sandboxed operating environment for process threads to run on. A computation worker can be considered a "processing node" of the computing cluster of the distributed computation system 920. In some implementations, at least one of the computing nodes 922 implements a cluster manager 928 to supervise the computation workers 926. Each of the computation workers 926 can execute one or more model-related process threads. In some implementations, a computation worker 926 only executes one type of model-related process thread, where process threads of that type share the same input data.

Anomalies, Threat Indicators, and Threats

As mentioned above, the security platform 502 detects anomalies in event data, and further detects threats based on detected anomalies. In some embodiments, the security platform also defines and detects an additional type of indicator of potential security breach, called threat indicators. Threat indicators are an intermediary level of potential security breach indicator defined within a hierarchy of security breach indicators that includes anomalies at the bottom level, threat indicators as an intermediate level, and threats at the top level.

Figure 10:
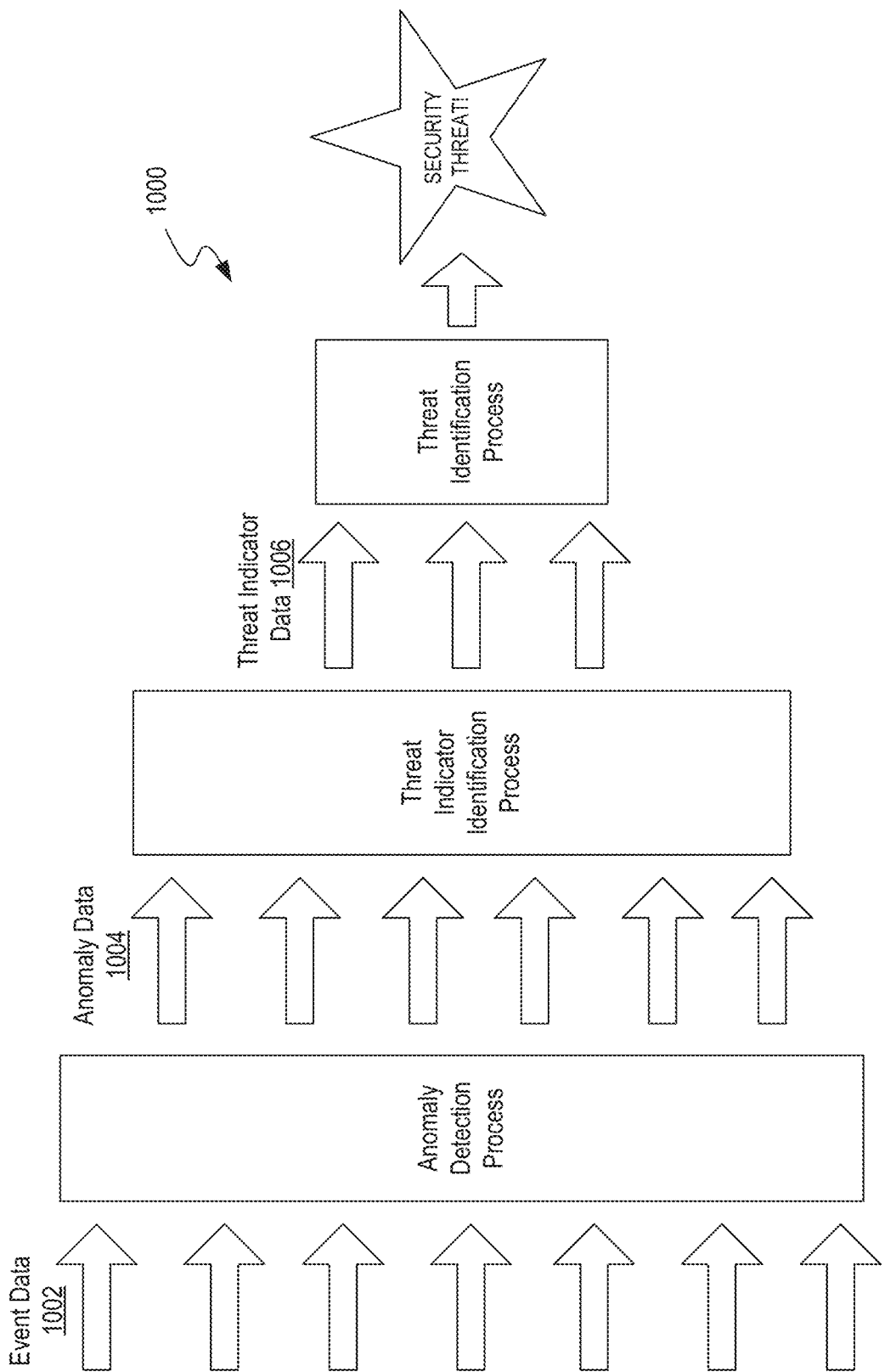
FIG. 10 illustrates a flow diagram illustrating at a high level, the processing hierarchy of detecting anomalies, identifying threat indicators, and identifying threats.

FIG. 10 is a flow diagram illustrating at a high level, a processing hierarchy 1000 of detecting anomalies, identifying threat indicators, and identifying threats with the security platform 300. Reducing false positives in identifying security threats to the network is one goal of the security platform. To this end, flow diagram describes an overall process 1000 by which large amounts of incoming event data 1002 are processed to detect anomalies. The resulting anomaly data 1004 comprising a plurality of anomalies across a computer network is then further processed to identify threat indicators. This identification of threat indicators can be conceptualized as an intermediate step between detecting anomalies and identifying security threats to a computer network. As shown, the threat indicator data 1006 comprising a plurality of threat indicators identified across a computer network is further processed to identify a security threat or threats.

As discussed above, an anomaly represents a detected variation from an expected pattern of behavior on the part of an entity, which variation may or may not constitute a threat. An anomaly represents an event of possible concern and possibly may be actionable or warrant further investigation. A detected anomaly in the activity on a computer network is often associated with one or more entities of the computer network, such as one or more physical computing devices, virtual computing devices, users, software modules, accounts, identifiers, and/or addresses. An anomaly or a set of anomalies may be evaluated (e.g., scored) together, which evaluation may result in a determination of a threat indicator or a threat. Threat indicators represent an escalation of events of concern and are evaluated to identify if a threat to the security of the network exists. As an example of scale, hundreds of millions of packets of incoming event data from various data sources may be processed to yield 100 anomalies, which may be further processed to yield 10 threat indicators, which may again be further processed to yield one or two threats.

Figure 11:
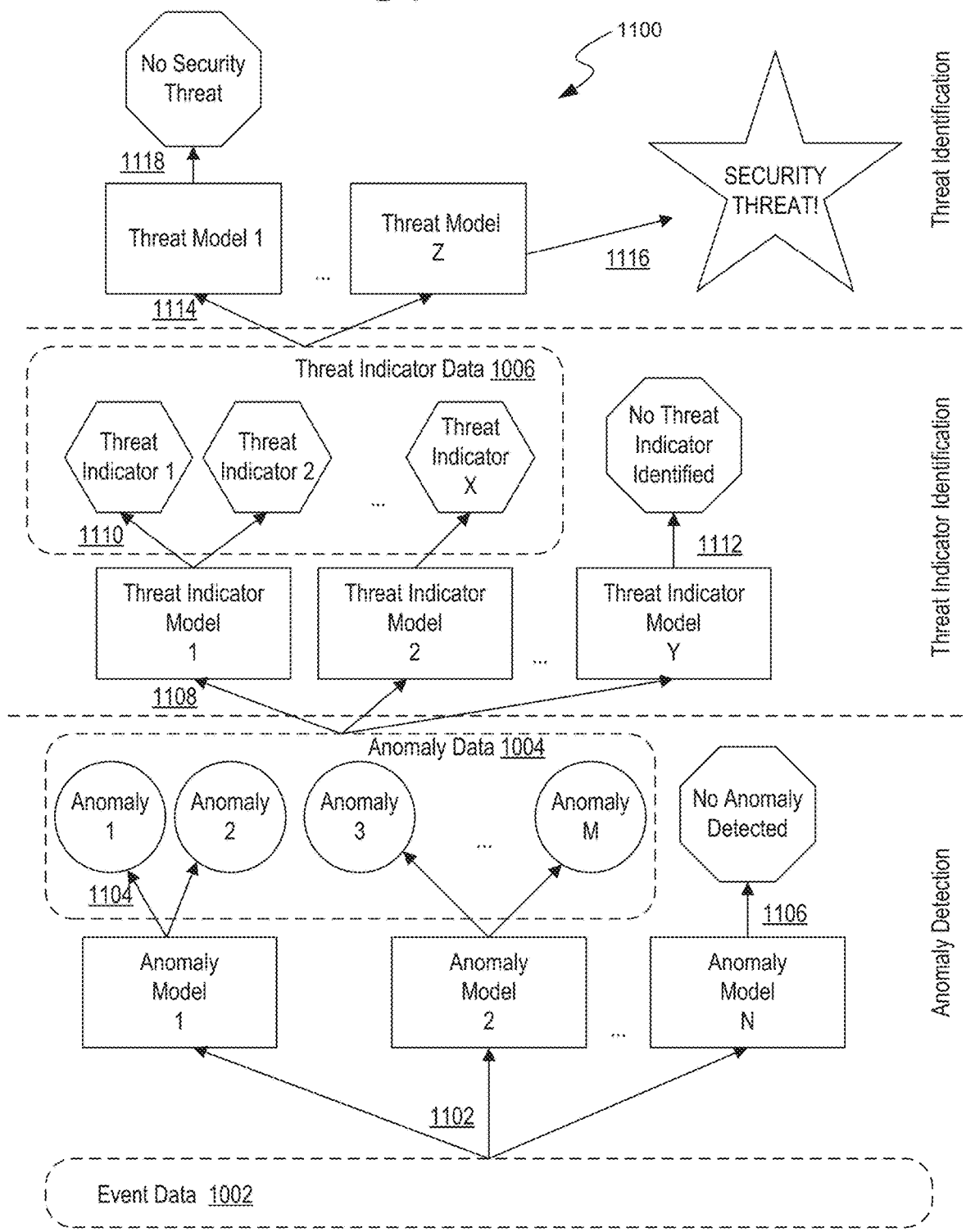
FIG. 11 illustrates a flow diagram illustrating in more detail an example process for detecting anomalies, identifying threat indicators, and identifying threats to network security.

FIG. 11 is a flow diagram illustrating in more detail an example process 1100 for detecting anomalies, identifying threat indicators, and identifying threats to network security. The process begins by detecting anomalies in activity on a computer network, based on received event data. As shown in FIG. 11 at step 1102, incoming event data 1002 is processed through a plurality of anomaly models 1 through N, which may be machine learning models as discussed above, and which at step 1104 may output anomaly data 1004 indicative of a plurality of anomalies 1 through M. As shown in FIG. 11, an anomaly is not necessarily detected for a given set of event data 1002. For example, as shown at step 1106, when the event data 1002 is processed by anomaly model N, no anomaly is detected.

The process continues with generating anomaly data 1004 indicative of the anomalies in response to the detection. The anomaly data 1004, as used herein, generally refers to the entire set or a subset of the detected anomalies across the computer network. For example, as represented in FIG. 11, the processing of event data 1002 according to the plurality of models at step 1102 leads to the outputting of anomalies (or associated data) 1 through M at step 1104. In some embodiments, the anomaly data 1004 includes only the event data 1002 associated with detected anomalies. In other words, the anomaly processing can be viewed as a filtering process to pass on only event data associated with anomalous activity. In other embodiments and as explained elsewhere in this specification, the anomaly data 1104 includes data in addition to the underlying event data 1002. For example, the anomaly data associated with a particular entity may include the underlying event data associated with the anomalous activity, annotated information about that entity (e.g., a user ID or account associated with a device), timing data associated with the anomalous activity (e.g., when the anomaly occurred, when a similar anomaly last occurred, or periodicity of this type of anomaly showing up for the particular entity), etc. In some embodiments, the anomaly data 1004 is stored in a data structure in the form of an anomaly graph. In such embodiments, the anomaly graph includes a plurality of vertices (nodes) representing entities associated with the computer network and a plurality of edges, each of the plurality of edges representing an anomaly linking two of the plurality of vertices (nodes).

The process continues with identifying threat indicators by processing the anomaly data. As shown in FIG. 11, at step 1108 the anomaly data 1004 (or at least a subset of anomaly data 1004) is processed through a plurality of threat indicator models 1 through Y, which at step 1110 may output threat indicator data 1006 including a plurality of threat indicators. In an embodiment, the processing of event data 1002 at step 1102 to produce anomaly data 1004 occurs on a per entity basis, while the processing of anomaly data 1004 at step 1108 can occur across the computer network whose security is being monitored, or at least a subgroup of the computer network. In other words, each anomaly 1 through M is detected as anomalous for a particular entity given event data associated with the given entity. While useful, this evaluation is performed without reference to other activity on the computer network. At step 1108, however, the plurality of threat indicator models 1 through Y are evaluating the plurality of anomalies 1 through M that occur across the computer network being monitored, not just for a particular entity. As shown in FIG. 11, a threat indicator is not necessarily identified based on a given set of anomaly data 1004. For example, as shown at step 1112, when the anomaly data 1004 is processed according to threat indicator model Y, no threat indicator is identified.

The process continues with generating threat indicator data 1006 indicative of the threat indicators in response to the identifying the threat indicators. Again, as with the anomaly data 1004, the threat indicator data 1006, as used herein, generally refers to the entire set or a subset of the identified threat indicators across the computer network being monitored. For example, as represented in FIG. 11, the processing of anomaly data 1004 according to the plurality of threat indicator models at step 1108 leads to the outputting of threat indicators (or associated data) 1 through X at step 1110. In some embodiments, the threat indicator data 1006 simply includes only the event data 1002 associated with identified threat indicators. In other words, the threat indicator processing can be viewed as a further filtering of the event data 1002 to pass on only event data 1002 associated with threat indicators. In other embodiments and as explained elsewhere in this specification, the threat indicator data 1006 includes data beyond the underlying event data 1002. For example, the threat indicator data 1006 may include the underlying event data associated with the anomalous activity, annotated information about the entities (e.g., users, devices, etc.) associated with the threat indicator, timing data associated with the threat indicator (e.g., when the threat indicator was raised, when a similar threat indicator last occurred, periodicity of this type of threat indicator, etc.). In some embodiments the threat indicator data 1006 is stored in a data structure in the form of a threat indicator graph. In such embodiments, the threat indicator graph may include a plurality of vertices (nodes) representing entities associated with the computer network and a plurality of edges, each of the plurality of edges representing a threat indicator linking two of the plurality of vertices (nodes). In other embodiments, the threat indicator data 1006 is instead stored in a relational database or a key-store database.

In some embodiments, the threat indicator data 1006 is incorporated into a network security graph, which may be the composite relationship graph discussed above. The network security graph can include a plurality of vertices (nodes) representing entities associated with the computer network and a plurality of edges linking two or more of the plurality of vertices (nodes). Each edge in such a graph represents an association between the entities represented by the vertices (nodes). Accordingly, anomalies defined in the anomaly data 1004, and/or threat indicators defined in the threat indicator data 1006, can be incorporated into the graph as vertices (nodes), each linked to one or more of the entities by one or more edges. For example, consider an example in which a threat indicator is identified and is associated with a user 1 using a device 1 operating on a computer network. In a highly simplified network security graph, the user and device are each defined as a node with an edge linking them to represent the association (i.e., user 1 uses device 1). An anomaly or a threat indicator is then incorporated as a third node into the simplified graph with edges linking to both the node representing user 1 and the node representing device 1.

The process continues with at step 1114 with identifying threats to the security of the computer network by processing the threat indicator data 1006.

Detecting Anomalies

Figure 12:
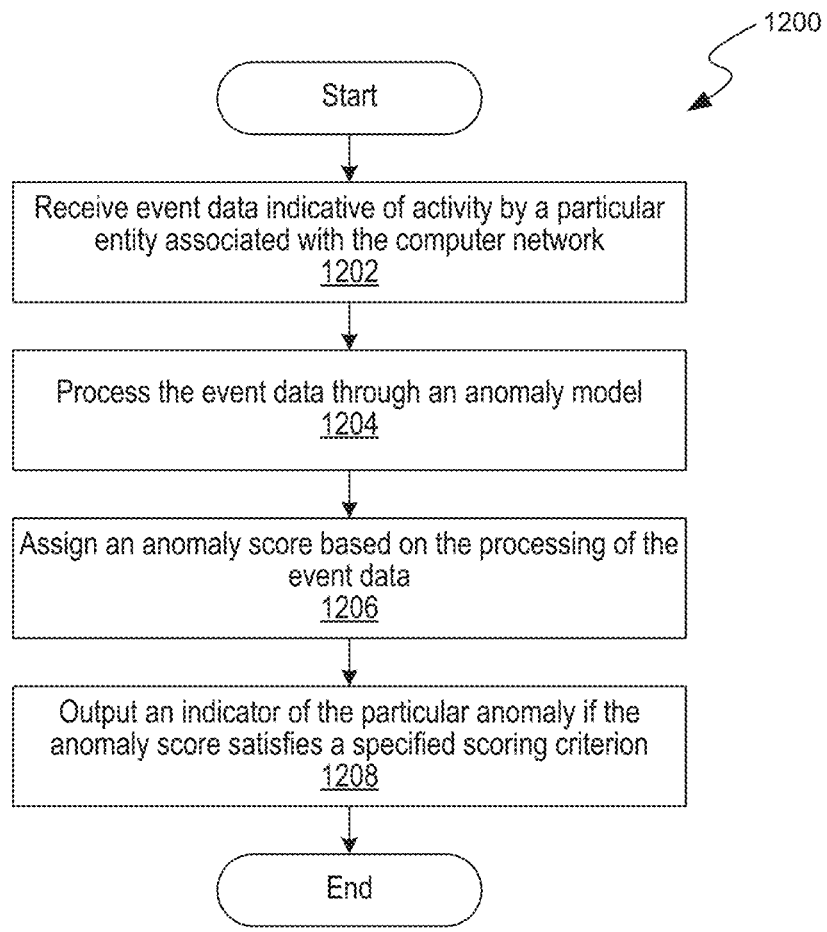
FIG. 12 illustrates a flow diagram describing an example process for detecting anomalies.

FIG. 12 is a flow diagram describing an example process 1200 for detecting anomalies. Process 1200 begins at step 1202 with receiving event data 1002 indicative of activity by a particular entity associated with a computer network. As described in more detail herein, in some embodiments, event data 1002 is received by a security platform from a plurality of entities associated with the computer network via an ETL pipeline.

Process 1200 continues at step 1204 with processing the event data 1002 through an anomaly model. According to an embodiment, an anomaly model includes at least model processing logic defining a process for assigning an anomaly score to the event data 1002 and a model state defining a set of parameters for applying the model processing logic. A plurality of anomaly models instances may be instantiated for each entity associated with the computer network. Each model instance may be of a particular model type configured to detect a particular category of anomalies based on incoming event data. For example, in an embodiment, a computer on computer network is associated with various anomaly models, with one of the anomaly models configured to detect an anomaly indicative of a machine generated beacon communication to an entity outside the computer network. According to some embodiments, the security platform includes anomaly models configured to detect a number of different kinds of anomalous activity, such as lateral movement, blacklisted entities, malware communications, rare events, and beacon activity. Each of these anomaly models would include unique processing logic and parameters for applying the processing logic. Similarly, each model instance (i.e., for a particular entity) may include unique processing logic and parameters for applying the processing logic. In some embodiments, processing of event data 1002 is performed in real-time as the event data is received. In such an embodiment, real-time processing may be performed by a processing engine optimized for high rate or real-time processing, such as Apache Storm™ or Apache Spark™ Streaming.

Process 1200 continues at step 1206 with assigning an anomaly score based on the processing of the event data 1002 through the anomaly model. Calculation of the anomaly score is done by the processing logic contained within the anomaly model and represents a quantification of a degree to which the processed event data is associated with anomalous activity on the network. In some embodiments, the anomaly score is a value in a specified range. For example, the resulting anomaly score may be a value between 0 and 10, with 0 being the least anomalous and 10 being the most anomalous.

Process 1200 continues at step 1208 with outputting an indicator of a particular anomaly if the anomaly score satisfies a specified criterion (e.g., exceeds a threshold). Continuing with the given example, the specified criterion may be set such that an anomaly is detected if the anomaly score is 6 or above, for example. The specified criterion need not be static, however. In some embodiments, the criterion (e.g., threshold) is dynamic and changes based on situational factors. The situational factors may include volume of event data, presence or absence of pre-conditional events, user configurations, and volume of detected anomalies.

Identifying Threat Indicators

Figure 13:
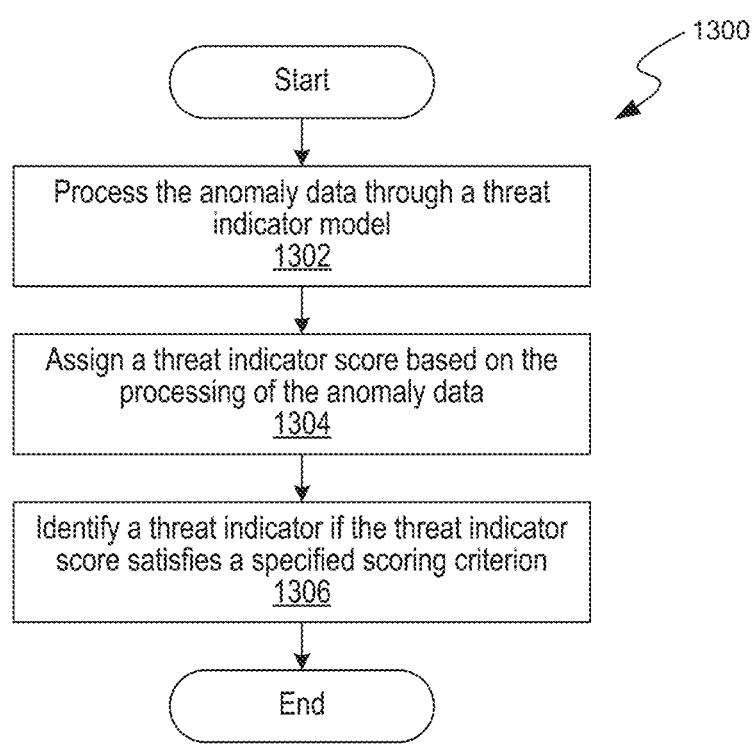
FIG. 13 illustrates a flow diagram describing an example process for identifying threat indicators.

FIG. 13 is a flow diagram describing an example process 1300 for identifying threat indicators. Process 1300 begins at step 1302 with processing the anomaly data 1004 through a threat indicator model, which like the anomaly models may also be a machine learning model. As with the previously described anomaly models, according to some embodiments, a threat indicator model includes model processing logic defining a process for assigning a threat indicator score based on processing the anomaly data 1004 and a model state defining a set of parameters for applying the model processing logic. Specific use cases for identifying threat indicators based on detected anomalies are discussed in more detail herein. In each described use case the steps to identifying a threat indicator may be incorporated into the processing logic. In some embodiments, processing of the anomaly data 1004 may include aggregating anomaly data across the computer network, correlating different anomalies within the anomaly data, and/or enhancing the anomaly data through enrichment using external data sources. In some embodiments, processing of anomaly data 1004 is performed in real-time as the event data is received and anomalies are generated. In such an embodiment, real-time processing may be performed by a processing engine optimized for high rate or real-time processing, for example, Apache Storm™ or Apache Spark™ Streaming. In some embodiments, processing of anomaly data 1004 is instead or additionally performed in batch mode. In such an embodiment, batch mode processing may be performed by a processing engine optimized for high volumes of data, such as Apache Spark™ on a Hadoop® distributed computing cluster.

Process 1300 continues at step 1304 with assigning a threat indicator score based on processing the anomaly data 1004. As with the anomaly models, in some embodiments, calculation of the threat indicator score is based on the processing logic contained within the threat indicator model and represents a quantification of a degree to which the processed anomaly data is associated with activity that may be a threat to the security of the network. As previously described, a threat indicator can be conceptualized as an escalation or intermediate step between detection of an anomaly and identification of a threat to network security. In some embodiments, the threat indicator score is a value in a specified range. For example, the resulting threat indicator score may be a value between 0 and 10, with 0 being the least threatening and 10 being the most threatening.

Process 1300 continues at step 1306 with identifying a threat indicator if the threat indicator score satisfies a specified criterion (e.g., a threshold). Continuing with the given example, the specified criterion may be set such that a threat indicator is identified if the threat indicator score is 6 or above, for example. The specified criterion need not be static, however. In some embodiments, the criterion (e.g., threshold) is dynamic and changes based on situational factors. The situational factors may include volume of event data, presence or absence of pre-conditional events, user configurations, and volume of detected anomalies.

Identifying Threats

Figure 14:
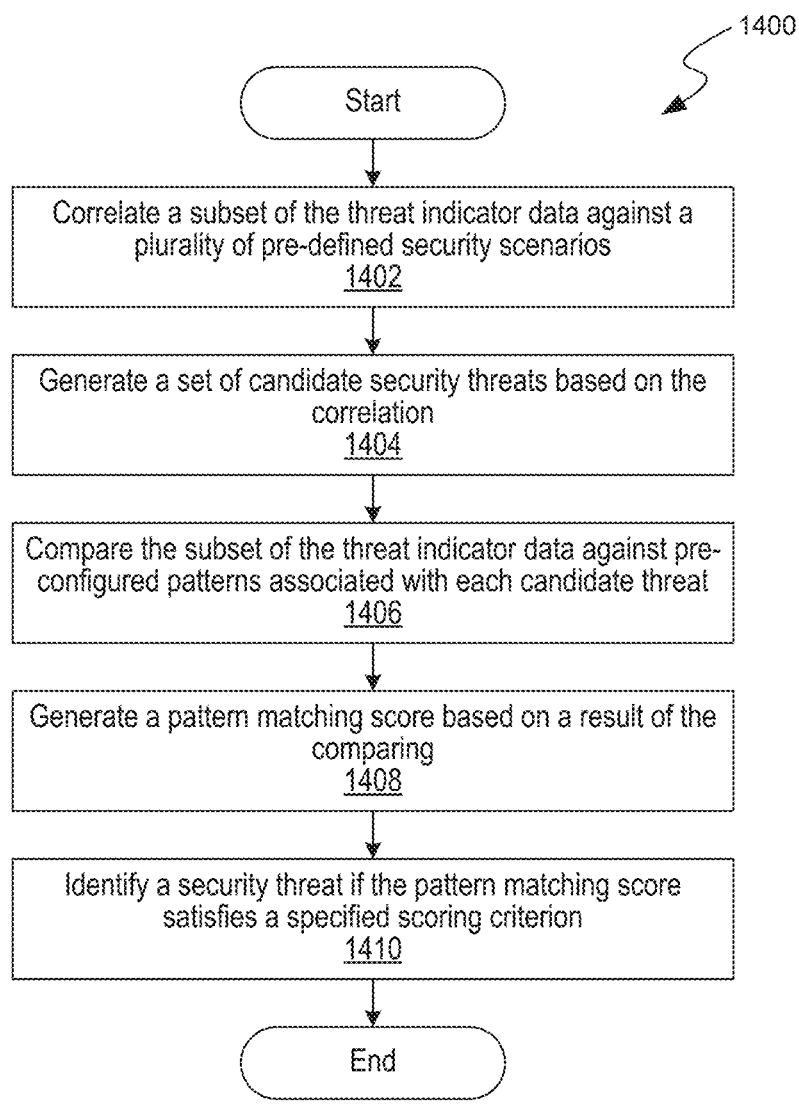
FIG. 14 illustrates a flow diagram describing an example process for identifying threats to network security based on threat indicators.

FIG. 14 is a flow diagram depicting an example process 1400 for identifying threats to the security of a computer network based on threat indicators. The process of identifying threats based on correlation of anomalies is described in more detail elsewhere in this specification. The same concept applies here, except that the threat is identified based on correlating the threat indicator data 1006 including a plurality of identified threat indicators instead of the anomaly data 1104.

Process 1400 begins at step 1402 with correlating the threat indicator data 1006, or at least a subset of the threat indicator data 1006. Process 1400 continues at step 1404 with identifying a set of candidate security threats based on the correlation. Types of correlation are described elsewhere in this specification but can include network-wide correlation for malware threats, connected component correlation for kill chain type threats, per-entity analysis for kill chain type threats, and per-burst analysis for insider threats.

Process 1400 continues at step 1406 with comparing the subset of the threat indicator data against pre-configured patterns or pre-set rules associated with each candidate threat. For example, an insider threat may be associated with known patterns identified by security experts and therefore be associated with pre-set rules. Process 1400 continues at step 1408 with generating a pattern matching score based on a result of the comparing. In some embodiments, the pattern matching score is a value in a set range. For example, the resulting pattern matching score may be a value between 0 and 10 with 0 being the least likely to be a threat and 10 being the most likely to be a threat.

Process 1400 concludes at step 1410 with identifying a security threat if the pattern matching score satisfies a specified criterion. Continuing with the given example, the specified criterion may be set such that a threat is identified if the pattern matching score is 6 or above. The specified criterion need not be static, however. In some embodiments, the criterion is dynamic, and changes based on situational factors. Situational factors may include volume of event data, presence or absence of pre-conditional events, user configurations, volume of detected anomalies, and involvement of mission critical systems.

Composite Relationship Graph and Graph-Based Detection

As described above, the security platform 502 can combine the individual event-specific relationship graphs from all processed events into a composite relationship graph that summarizes all significant (from a security standpoint) network activity for an entire enterprise or network. The composite relationship graph can include nodes representing the various entities associated with the network as well as nodes representing the detected anomalies. Subsets, or "projections," of the composite relationship graph can then be used by various different threat models to detect security threats, as will now be further described.

FIGS. 15 through 18 relate to a method for storing and analyzing a security data structure (e.g., a graph including nodes and edges) for identifying security threats in a computer network. The nodes represent entities in or associated with the computer network, such as users, devices, applications, and anomalies. The edges, which connect nodes, represent the relationships between the entities. An ETL process generates event-specific graph data structures (also referred to as "mini-graphs" or "relationship graphs") corresponding to events that have occurred in the computer network. The method introduced here detects anomalies based on the mini-graphs, and combines the anomalies with the mini-graphs to generate the composite relationship graph, which may also be called an "enterprise security graph" to the extent it may relate to a network of a particular enterprise (e.g., a corporation, educational institution, government agency, etc.). The composite relationship graph includes nodes that represent the anomalies and edges that represent relationships between anomalies and other entities involved in the events.

During the above-mentioned combining, the method condenses network activities that are of the same type and associated with the same user into a single entry of combined network activity. The method further assigns these combined network activities into different projections of the composite relationship graph, depending on the type of activity. Each projection represents a subset of the composite relationship graph that relates to a certain type or types of user action or other category (e.g., login, web visit, file access, anomaly, etc.). The projection can be stored in a cluster (e.g., an Apache Hadoop® cluster) and further broken down into multiple files based on the timestamps. Relevant files can be stored in proximity in the cluster for data access efficiency.

The method further identifies security threats by correlating the anomalies across the composite relationship graph. For example, the method can use a neighborhood computation algorithm to identify a group of related anomalies in the composite relationship graph that represent a security threat. Alternatively, the method can identify an insider who poses a security threat based on a group of anomalies being close to each other in time and their confidence metrics.

Figure 15:
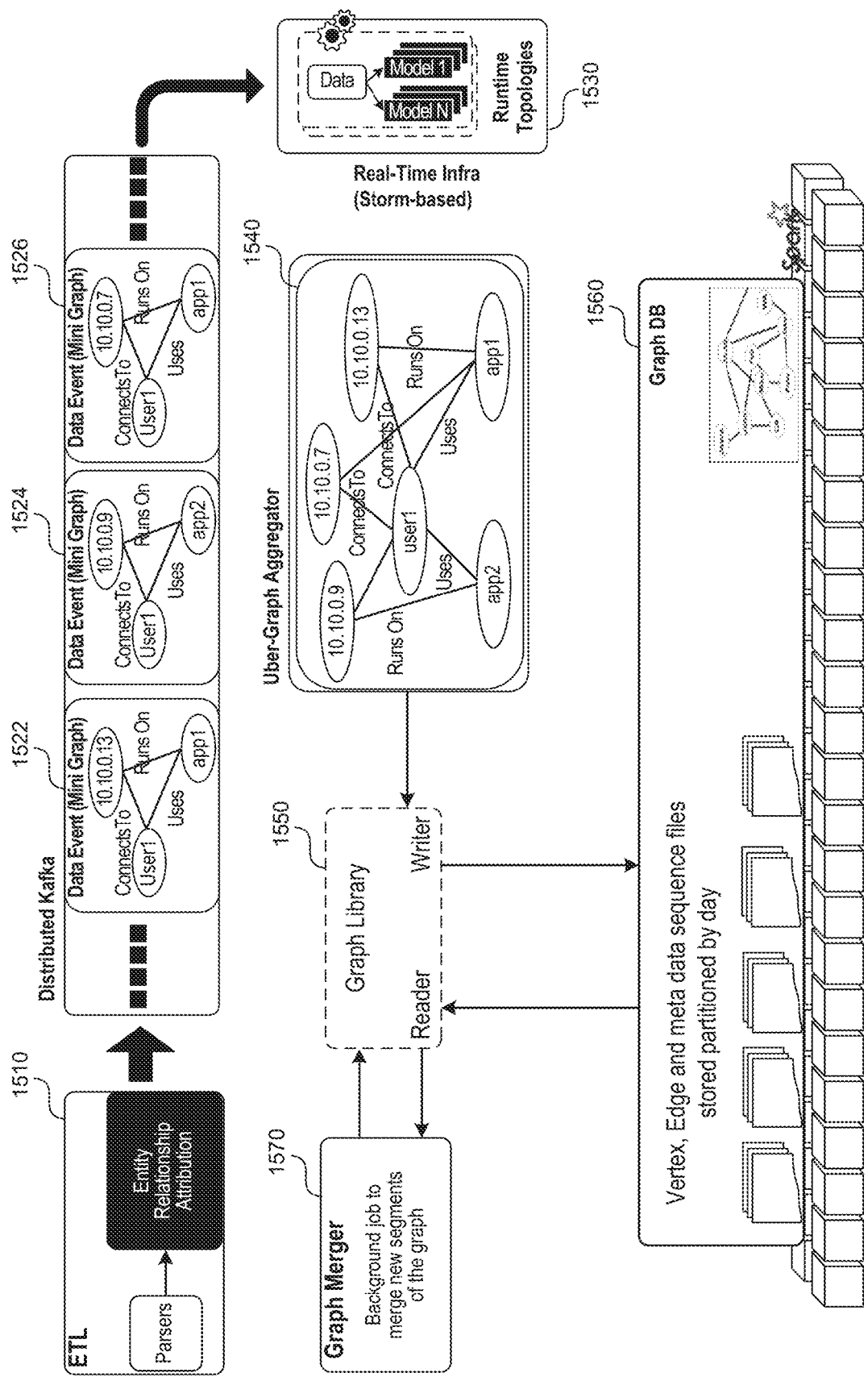
FIG. 15 illustrates an example process of combining and storing event-specific relationship graphs into a composite relationship graph.

FIG. 15 illustrates an example process of combining and storing relationship graphs into a composite relationship graph. The process receives event data from various data sources. The event data can be, e.g., timestamped machine data. The process uses parsers 1510 to conduct an ETL procedure to generate information about the entities in the computer network and the relationships between the entities.

The process organizes the information about the entities and the relationships for each event into a mini-graph. Each of the mini-graphs 1522, 1524 and 1526 includes nodes and one or more edges each interconnecting a pair of the nodes. The nodes represent the entities involved in the particular event. The edges represent the relationships between the entities in the event. An analytics engine 1530 can process these mini-graphs 1522, 1524 and 1526 (e.g., using various machine learning models) to detect anomalies.

A separate machine learning model called aggregator 1540 combines the mini-graphs and detected anomalies into the composite relationship graph. The composite relationship graph includes nodes that represent the entities, as well as nodes that represent the detected anomalies. In some embodiments, the composite relationship graph is created first in volatile memory of one or more computing devices, and then saved to non-volatile storage.

A graph library component 1550 handles the storage of the composite relationship graph in a non-volatile storage facility called graph database 1560. In the graph database 1560, the nodes (also referred to as vertices), edges and associated metadata of the composite relationship graph are stored in one or more data files. The nodes and edges of the composite relationship can be partitioned based on the timestamps (from the event data) of the corresponding network activities. Each data file can be designated for storing nodes and edges for a particular time period.

In addition, a graph merger component 1570 runs a background job to merge new segments into the composite relationship graph at a predetermined periodicity. As the system continuously receives new event data and generates new mini-graphs and new anomalies based on the new event data, the graph merger component 1570 merges these newly created mini-graphs and associated detected anomalies into the composite relationship graph.

Figure 16:
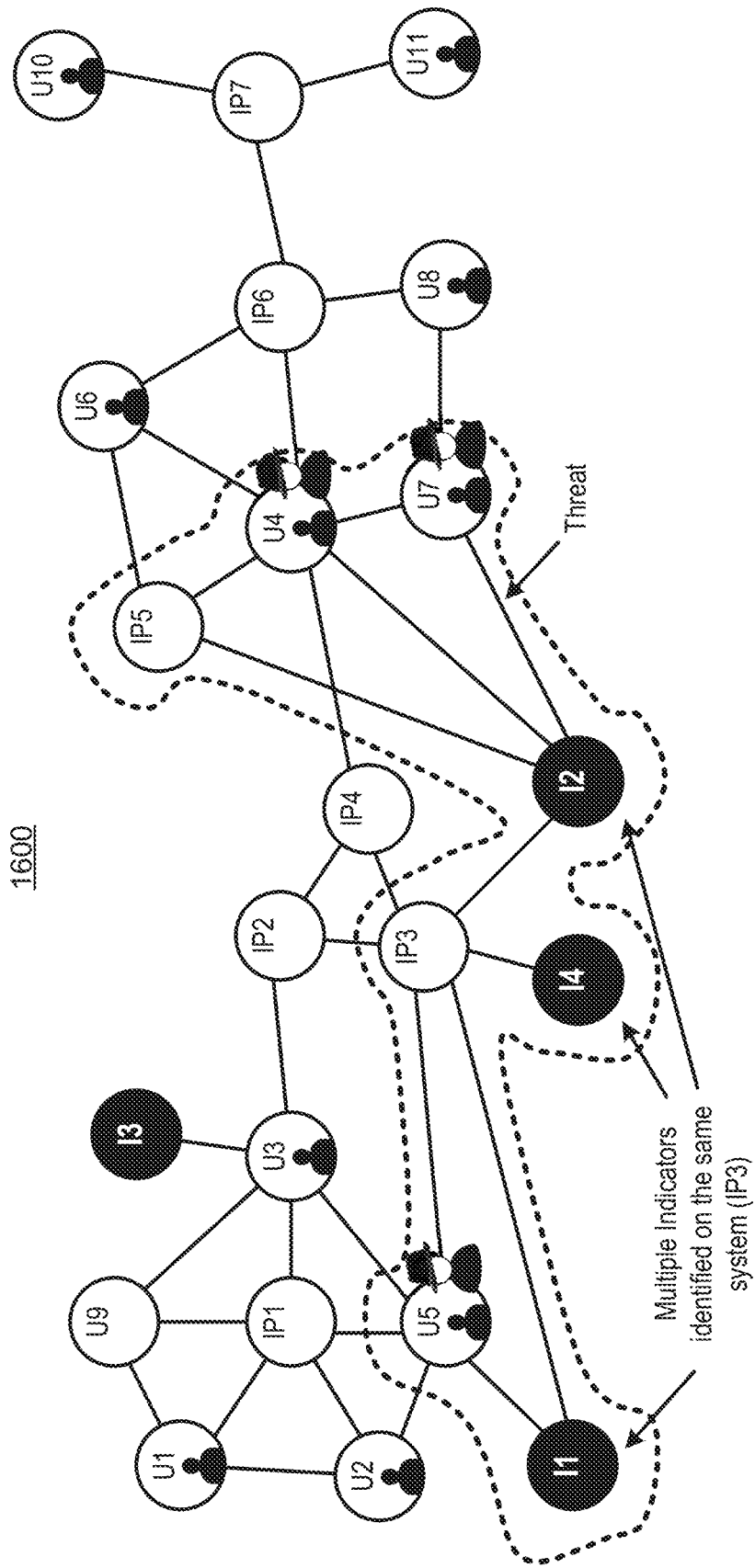
FIG. 16 illustrates an example of a composite relationship graph.

FIG. 16 illustrates an example of a composite relationship graph. The illustrated composite relationship graph 1600 includes a number of nodes U1 through U11 that represent users (also referred to as "user nodes") and a number of nodes IP1 through IP7 that represent network devices (also referred to as "device nodes"). The composite relationship graph 1600 further includes a number of nodes I1 through I4 that represent anomalies (also referred to as "anomaly nodes"). For example, anomaly node I1 suggests that a user represented by node U5 has engaged in certain suspicious activity with, or in relation to, the device represented by node IP3.

In graph 1600 there are three anomaly nodes I1, I2 and I4 connected to the same device node IP3. These anomaly nodes may be indicative of a security threat involving the device IP3. The anomaly nodes I1, I2 and I4 also connect to the user nodes U4, U5 and U7 and device node IP5. This may indicate that users U4, U5 and U7 are suspicious, meaning these users can potentially be malicious users who engage in or will engage in activities detrimental to the security of the computer network. For example, users U4, U5 and U7 may be invaders who have breached network devices with malicious intentions. Thus, a decision engine (e.g., including a machine learning model) can identify a security threat represented by a group of nodes in question, including, in the illustrated example, anomaly nodes I1, I2 and I4, user nodes U4, U5 and U7, and device nodes IP3 and IP5.

The composite relationship graph can include a number of projections that correspond to different categories of computer network activities. Each projection is a subset of the composite relationship graph and includes edges representing computer network activities of a particular category. When the graph library component 1550 writes the composite relationship graph into non-volatile storage (as shown in FIG. 15), the graph library component 1550 can write the content of the different projections into separate data files. Alternatively, the graph library component 1550 can write the different projections into other types of data containers, such as logical unit numbers (LUNs).

Figure 17:
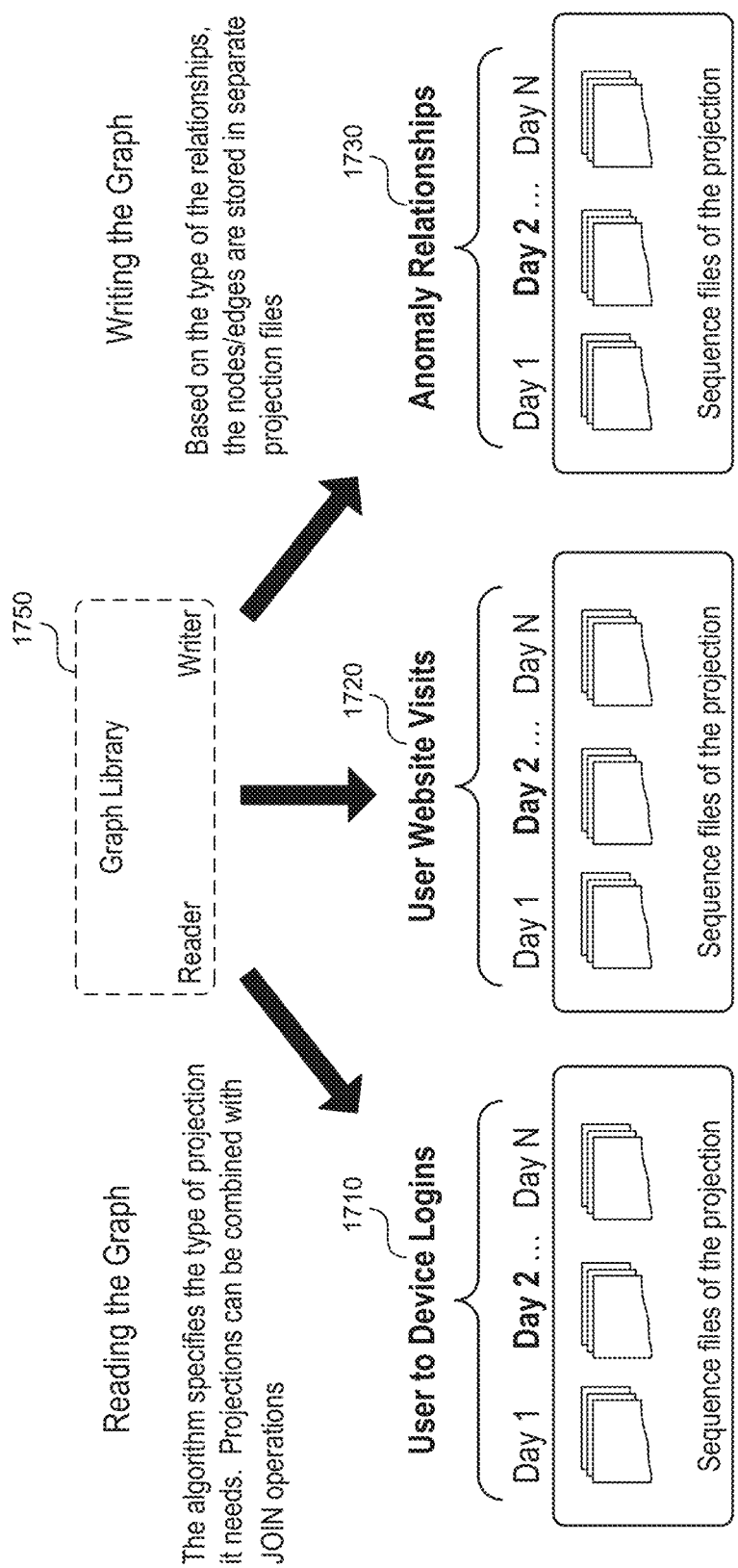
FIG. 17 illustrates an example of how a composite relationship graph can be stored as separate projections.

FIG. 17 illustrates an example of how a composite relationship graph can be stored as separate projections. For each edge (relationship) in the composite relationship graph, the graph library component 1750 examines the edge's type to determine the projection to which the edge belongs. The different projections in the illustrated example include a login projection 1710, a website-visit projection 1720 and an anomaly projection 1730. In some alternative embodiments, the composite relationship graph can include other types of projections, such as a projection for activities of users accessing files stored in the devices in the computer network.

If the graph library component 1750 determines that a particular edge corresponds to an activity of a user logging into a device, the graph library component 1750 assigns the particular edge to that particular login projection. For example, if the graph library component 1750 determines that a particular edge corresponds to an activity of a user visiting a website, the graph library component 1750 assigns the particular edge to the website-visit projection 1720. If the graph library component 1750 determines that a particular edge relates to an anomaly (e.g., the edge connecting to an anomaly node), the graph library component 1750 assigns the particular edge to the anomaly projection 1730.

The graph library component 1750 can further break down the projections into a plurality of files. Each of the files stores network activities that have occurred in a particular time period. For example, as shown in FIG. 17, the projection is broken down into a sequence of files, each of which stores network activities that have occurred in one particular day. In some alternative embodiments, the graph library component 1750 can further break down the projection into finer granularity. For example, the projection may be broken down into a sequence of directories corresponding to days. Each directory may then include files corresponding to each hour of the day.

In some embodiments, the graph library component 1750 can dynamically adjust the granularity. For example, in one embodiment, for network activities that occurred during the last two months, the graph library component 1750 may break down the projection data into files corresponding to each hour of the last two months; whereas, for network activities that occurred prior to the last two months, the graph library component 1750 may break down the projection data into files corresponding two months into files corresponding to each week or each month. As time goes by, some network activities stored in a daily granularity become older than two months. Thus, the graph library component 1750 continuously combines files storing these network activities into files corresponding to the weekly or monthly granularity.

Figure 18:
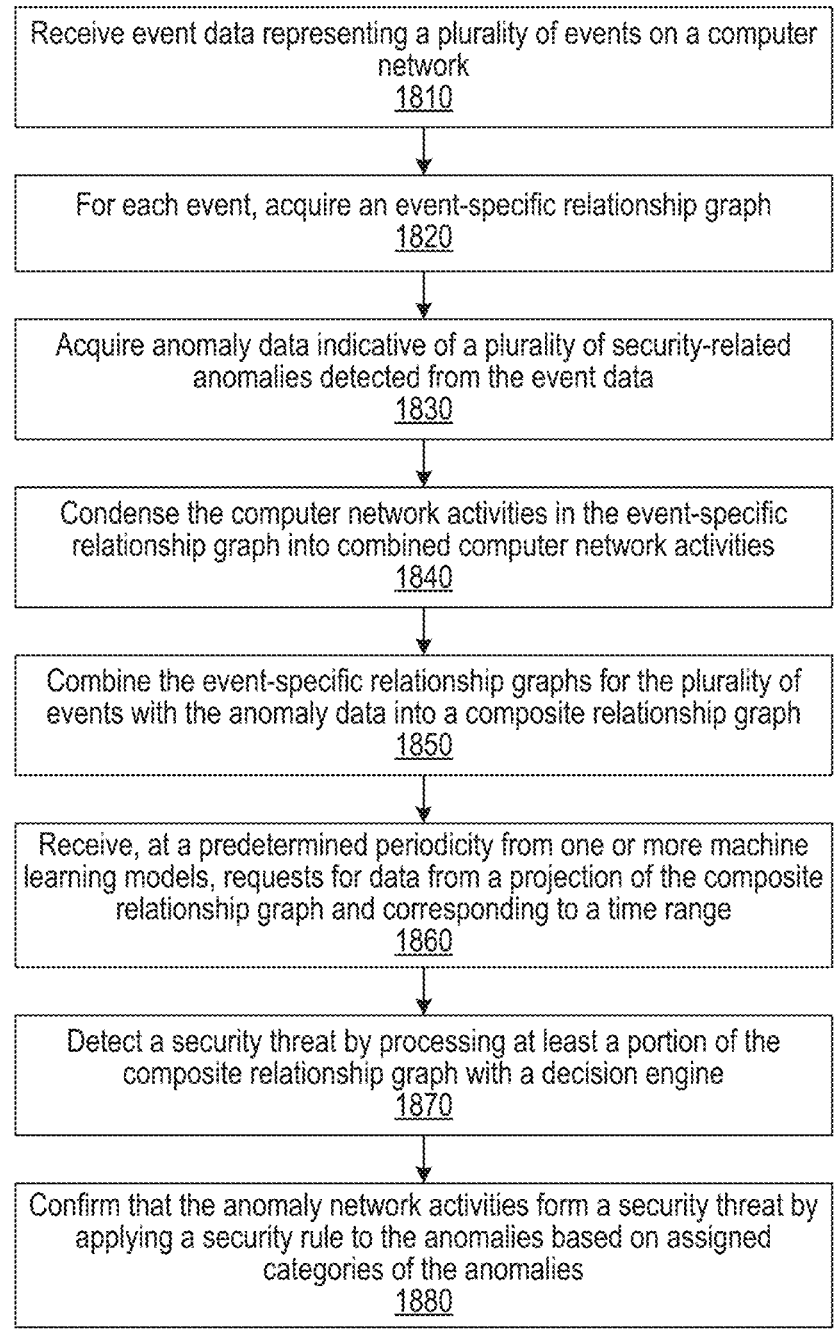
FIG. 18 illustrates a sample process of combining event-specific relationship graphs into a composite relationship graph and detecting a security threat based on the composite relationship graph.

FIG. 18 illustrates an example process of combining event-specific relationship graphs into a composite relationship graph and detecting a security threat based on the composite relationship graph. At step 1810, the process receives event data representing a plurality of events on a computer network. The event data are indicative of a plurality of entities and at least one anomaly involved in the events. The entities can include various types of entities involved in the computer network. For example, the entities can include, e.g., devices in the computer network, users of the devices in the computer network, websites, applications and/or data files stored in the devices in the computer network.

At step 1820, for each event, the process acquires an event-specific relationship graph (e.g., a mini-graph), for example, from the data intake and preparation stage via the distributed messaging platform. The event-specific relationship graph is indicative of entities involved in the associated event and one or more relationships between the entities involved in the event. The event-specific relationship graph includes a number of nodes and at least one edge interconnecting nodes. The nodes represent the entities involved in the event. Each edge represents an interaction between a pair of the entities.

At step 1830, the process acquires anomaly data indicative of various security-related anomalies detected from the event data. For each anomaly detected from the event data, the computer system can further store the event data associated with the anomaly in long-term (non-volatile) storage. In that way, the security platform 300 can generate a visualization of the event data associated with the anomaly when the platform receives an instruction to visualize details of the anomaly.

At step 1840, the process condenses the computer network activities in the event-specific relationship graph into combined computer network activities. For each event, the process identifies one or more computer network activities of a particular type based on the event-specific relationship graph. The identified computer network activities are associated with the same entity and occur during a predefined time period. The process then combines the computer network activities of the particular type into a data entry representing the combined computer network activity and counts the computer network activities that occur during the predefined time period.

The process stores the data entry representing the combined computer network activity and the count in non-volatile storage, such as a data file designated for the particular type and the time period. In some embodiments, the stored data entry for the combined computer network activity includes information about an activity type, an originating entity, a target entity, the number of times the computer network activities occur in the time period, a start time, an end time, an average gap period between the computer network activities that occur in the time period, or a standard deviation of gap periods between the computer network activities that occur in the time period.

At step 1850, the process combines the event-specific relationship graphs for the received events with the anomaly data into a composite relationship graph. The composite relationship graph includes nodes that represent the entities involved in the events and nodes that represent the anomalies detected based on the event data. The entities involved in the events include at least two types of entities, such as users and devices. The composite relationship graph further includes edges that represent the relationships between the entities involved in the events and the anomalies.

As shown in FIG. 17, the composite relationship graph can include a plurality of projections. Each of the projections is a subset of the composite relationship graph that includes edges representing a plurality of computer network activities of a particular category. In some embodiments, the particular category of network activities corresponds to users logging into devices in the computer network, users visiting websites, users accessing files stored devices in the computer network, or users conducting anomaly activities.

As illustrated in FIG. 17, one of the projections is the anomaly projection 1730, which is a subset of the composite relationship graph that includes edges representing anomalous activities conducted by users. Each projection can be stored in a cluster of storage device and distributed amongst data containers (e.g., files) based on timestamps of the associated event data. The computer system can further identify events that have timestamps satisfying a specific closeness criterion (e.g., the timestamps having differences less than a threshold value), and store the edge data of these identified computer network activities in proximity to each other in the long-term non-volatile storage. In this way, the read efficiency for the computer network activities can be improved.

For each combined computer network activity, the computer system can determine an association between the combined computer network activity of the particular type and a particular projection of the composite relationship graph. Then the combined computer network activity is stored into a file designated for the associated projection.

In one embodiment, the computer system transfers the data structures representing the edges of the composite relationship graphs from memory of the computer system to persistent (long-term) storage at a predetermined periodicity. For example, if the computer system detects that a time period since a last time of transferring the data structures representing the edges of the composite relationship graphs from memory of the computer system to a persistent storage exceeds a threshold value, the computer system transfers the data structures currently in memory to the persistent storage. The computer system can further have a memory storage size limit. Once the size of the data structures representing the edges of the composite relationship graphs stored in the memory exceeds the memory storage size limit, the computer system transfers the data structures currently in the memory of the computer system to the persistent storage.

Referring again to FIG. 18, at step 1860, the process receives, at a specified periodicity from one or more machine learning models, requests for data of a projection of the composite relationship graph and corresponding to a time range. The requested data can include combined computer network activities including information about computer network activities from multiple events. Since the requests from the machine learning models are for data from a common projection range and corresponding to a common time range, at step 1870, the process combines the data within the common projection range and the common time range into a single input data structure as an input for the machine learning models.

In some embodiments, there are different types of machine learning models. Some machine learning model receives a portion (e.g., projection) of the composite relationship graph as inputs and identify security threats and/or anomalies based thereon. The one or more machine learning models can be executed in a batch mode.

At step 1870, the process detects a security threat by processing at least a portion (e.g., one or more projections) of the composite relationship graph with a decision engine. The decision can be, e.g., a machine learning model or an analytics engine running a machine learning model. During the detection, the process first converts at least a portion of the composite relationship graph (e.g., the anomaly projection) into an anomaly relationship graph. The anomaly relationship graph includes anomaly nodes that represent anomalies and entity nodes that represent entities in the computer network. The computer system inputs the anomaly relationship graph into the decision engine. The decision engine can then identify a security threat by analyzing the anomalies in any of various different ways.

One possible way is that a machine learning model identifies a set of anomaly nodes interconnecting entities nodes that form a neighborhood cluster in the anomaly relation graph. Another possible way is that the machine learning model identifies a subset of the anomaly relationship graph including anomaly nodes and entity nodes that have no relationships with other nodes outside of the subset in the anomaly relationship graph. Yet another possible way is that the machine learning model identifies a set of anomaly nodes directly connecting a particular entity node in the anomaly relationship graph. The machine learning model can further identify a group of anomaly nodes within the identified plurality of anomaly nodes, wherein the group of anomaly nodes have timestamps that satisfy a specific closeness criterion. For example, the timestamps may have an average time gap less than a threshold value.

At step 1880, as an optional step, the process confirms that the anomalies form a security threat by applying a security rule to the anomalies based on assigned categories of the anomalies. The computer system can assign the anomalies into categories of, e.g., internal anomaly, malware anomaly, incoming anomaly and exfiltration anomaly. An administrator of the computer network can specify the rules based on his/her knowledge of typical security threats that occur in the computer network.

The identified set of anomaly nodes represent a set of related anomalies. The process can present the security threat including the set of anomalies to an administrator of the computer network or any party that handles security issues of the computer network.

Any of the steps in the process illustrated in FIG. 18 can be performed by processing logic of a machine learning model. Further, any of the steps can be performed in real-time as the event data are received, or in a batch mode based on the event data retrieved from persistent storage.

Anomaly Threat Detection without Pre-Defined Security Scenarios Across Time and Entities With the above discussion in mind, the disclosed platform (e.g., platform 502) embodies a graph-based network security analytic framework that can combine multiple sources of information and security knowledge. The disclosed platform can also be configured to detect risky behaviors and potential threats without having any pre-defined security case or scenario. At a high level, the embodiments discussed herein below are particularly advantageous in detecting patterns of risky activity that spans across multiple days and/or multiple entities (e.g., users or devices).

Depending on the implementation, the input can be data reflecting events that represent activities that are already flagged as anomalies (discussed above, e.g., an anomaly projection 1730), or in some other embodiments, regular network activities regardless of being earmarked as abnormal or not. The entities associated with the activities can be grouped into smaller time units, for example, on a per day basis. For each time unit, all values corresponding to a number of features (e.g., count of anomalies, anomaly types, entities involved, and timing) are gathered from the entities (and underlying events) in the time unit. Various features (which are generally representative of risk factors) that capture how risky is the underlying activity are defined, and a subset of the riskiest days of activity can be found. This can be achieved by, for example, computing a risk score for each day and according to the features in the unit. The riskiest days can be selected, for example, by taking a threshold or by clustering the days and selecting clusters with higher risks.

Next, a graph can be built with links between the time units, the links indicating how strong the time units are related. The links can also receive scoring, and the scoring for the links can be based on, for example, number of common entities, decay for distance, or whether nodes between the links both have common anomaly categories. Then, the resulting graph can be compared with encoded or known security knowledge to further adjust the scores. For example, a known attack pattern is a file transfer taking place after malware installation, which may increase the risk score. The reverse pattern may result in score reduction. Additional filtering can be made on the graph. Thereafter, threats can be detected based on the adjusted risk score for a component (i.e., a group of linked entities) as well as a number of other factors. This approach helps to correlate and identify anomalies across time and across multiple entities.

For simplicity, the following discussion focuses on the examples that use anomalies as input. However, it will be appreciated by a person of ordinary skill in the art that regular relationship projections or other graph-based data may be processed for anomaly and threat detection in a similar manner.

Figure 19:
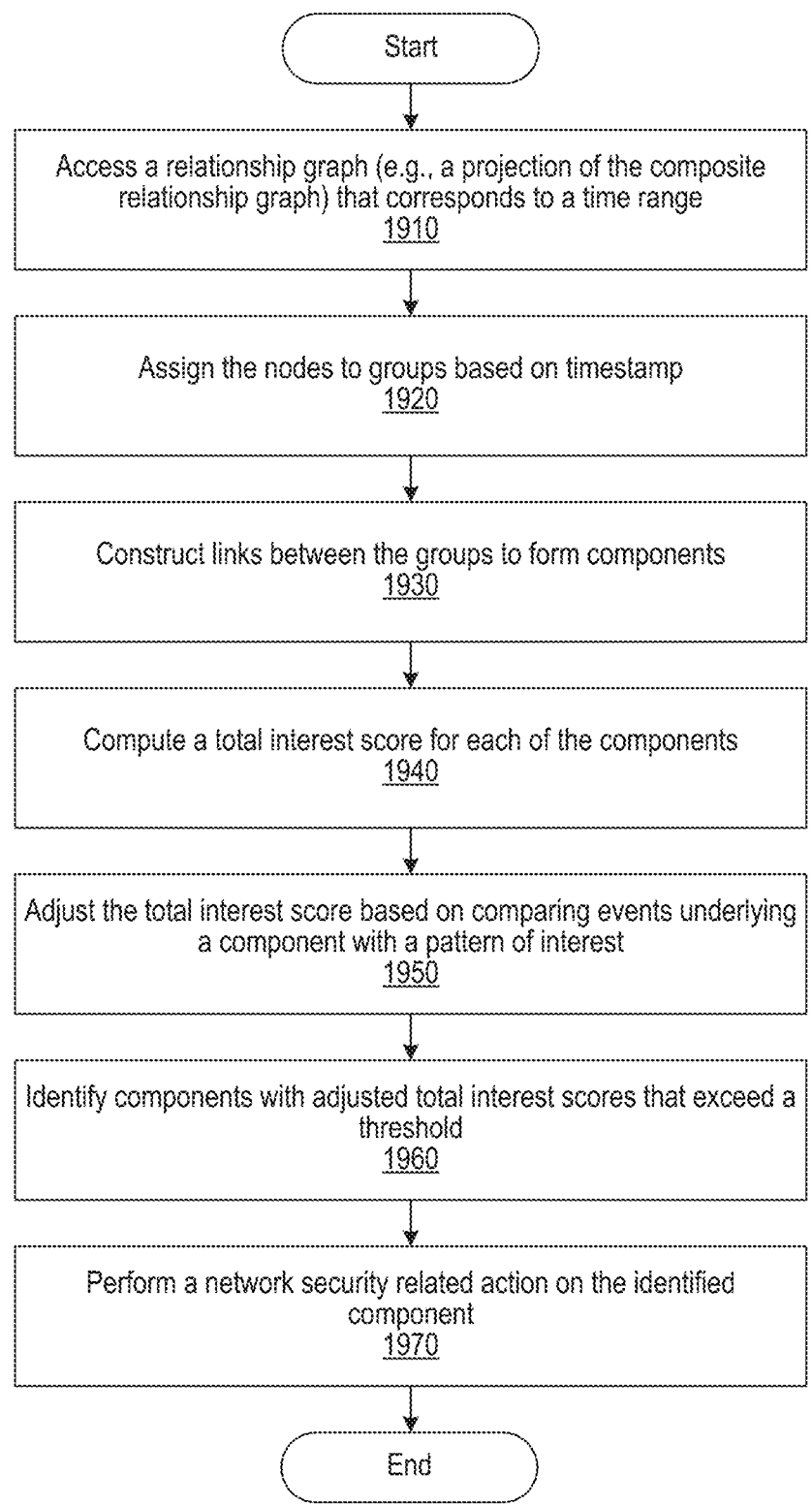
FIG. 19 illustrates a sample process of processing a projection of a composite relationship graph for detecting a security threat across time and entities.

FIG. 19 illustrates a sample process of processing a projection of a composite relationship graph for detecting a security threat across time and entities. The sample process can be performed, for example, by the analytic engine as a recipient of the output from step 1860 for purposes of security threat detection described in relation to step 1870. At step 1910, data related to events that have occurred in the network can be accessed by an analytic engine in the security platform (e.g., platform 502). An example of such data input can be a projection of a composite relationship graph, such as an anomaly projection 1730 (i.e., a subset of a composite relationship graph that includes edges representing a plurality of anomaly activities conducted by entities). As mentioned above, the relationship graphs have entities as nodes and the relationships among the entities as links. Examples of the analytic engine include the batch analyzer 640 (introduced above), which can be machine learning model based. In some implementation, the batch analysis engine is implemented using APACHE SPARK™. The data is stored in a distributed data store and managed by a graph library component (e.g., graph library component 1750), and the data store can be implemented using APACHE HADOOP®. The method illustrated in FIG. 19 may be repeated at a predetermined periodicity (e.g., once a week or a month).

The anomaly projection that is accessed by the batch analytic engine can correspond to a time range. The time range can be configurable to include data from, for example, the last N days or since the beginning of the system's operation. Typically, the time range is more than one day. The relationship graph reflects a batch of events that occurred during the time range. Each event of the batch of events includes timestamped, raw machine data. The machine data may reflect the activities (e.g., a log-in, an application installation, or a file transfer) occurred in an information technology (IT) or a security technology environment. In addition to the activities themselves, the machine data may also include critical information relating to the activities, such a time at which the activities occurred, and/or a number of entities associated with the activities. The entity here can be a user or a device, such as introduced above with respect to FIGS. 7, 8A and 8B. In the case where the input is anomaly projections, the nodes may have been earmarked/labeled as anomalous (with the processes discussed above) and, in some embodiments, may have been assigned anomaly scores to reflect different degrees of anomaly as determined by a previous data analytic stage (e.g., real-time analyzer 610).

After data input, an optional filtering step can be performed to preprocess the data so as to reduce data size and increase the platform's efficiency and scalability, as well as to reduce the noise that may affect the accuracy of detection. In some examples, anomalies that have scores no greater than a minimum threshold value are removed. In another example, filtering can be performed by removing nodes that include a known whitelisted entity. In yet another example, filtering can be performed by removing nodes that include an entity having an exceeding number of anomaly links to other entities as compared to a threshold. This is so-called "statistical white-listing": the goal of the filtering is to find entities that have too many anomalies, and drop all the anomalies that involve these entities. The threshold for determining how many is "too many" can be configurable. This typically helps in cases where a large number of anomalies involving a specific entity, perhaps due to programming bugs or the administrator not understanding the semantics enough.

At step 1920, the nodes in the anomaly graph are assigned to a number of groups. The assignment can be based on the timestamps of the underlying events of the nodes. Each group corresponds to a time unit and includes the nodes associated with activities that occurred in the time unit. It is noted that a node need not be assigned to only one group. One or more embodiments provide that the time unit for a group is one day. Therefore, in the examples where the time unit is one day, the nodes may be assigned to a (user, day) group and/or a (device, day) group to create anomalous groups (also may be referred to hereinafter as "anomalousDays"). A filtering step may be performed to remove duplicate groups so that only unique groups are further processed and analyzed.

Figure 20:
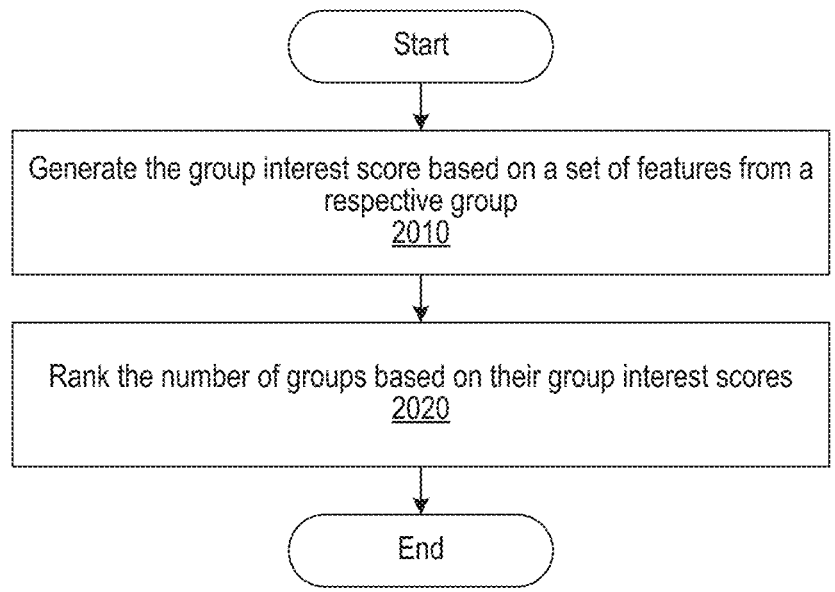
FIG. 20 illustrates a sample process of generating a group interest score for a particular group.

After step 1920 and before step 1930, a group interest score can be generated for each of the groups. This step can be performed to further siphon the data so as to find the group that generates enough interest for purposes of anomaly and threat detection. A sample process of generating a group interest score for a particular group is illustrated in FIG. 20.

At step 2010, a group interest score for a respective group can be generated based on a set of features from the respective group. The set of features can be identified by a predetermined list of features that are characteristic of the activities recorded in the events in the respective group. More specifically, according to one or more embodiments, for each group, the group interest score can be generated by accounting all the features in the group that are characteristic of the anomalies included in the anomalousDays. The list of features are selected to reflect or capture how "interesting" or "risky" a set of anomalies is. Examples of the features that may be suitable to be on the list of features include: (1) the count of the anomalies in the group, (2) the count of distinct anomaly types in the group, (3) the count of the distinct of machine learning models that raised anomalies in the group, (4) the sum of the scores of off-hours anomalies in the group, (5) the sum of the scores of external alarm anomalies in the group, (6) the sum of the scores of rule-based anomalies in the group, and (7) the sum of the popularity adjusted scores. This popularity adjusted score is assigned by a rarity model, which gives a higher score for a rarer type of anomaly. In some implementations, adjustment by the popularity is based on a multiplication product between the original anomaly score and the popularity, where the popularity can be defined by the number of times such type anomalies are observed as compared to a total number of anomalies detected.

Additional examples of the feature that may be suitable can include: the count of anomaly entities that are blacklisted (e.g., if there are more than one anomalies involving the same blacklisted entity, the entity may be counted multiple times); the count of anomaly entities that are listed in a watch list (e.g., if there are more than one anomalies involving the same entity in a watch list, the entity may be counted multiple times); the days of anomalous activity for a specific entity (e.g., user or device). Other features that may be included are, for example: risk ranking (internal versus external); the anomaly's status (e.g., being already blocked or currently allowed); whether the group belongs to a peer's group; the sum of all the scores of anomalies in the group; the anomaly counts per category; the anomaly counts per anomaly type; and the number of threat rules that have matched for each of the entities in the group.

The group interest score represents how interesting/risky the group (e.g., the day) as a whole is. Like discussed above, each group may include nodes (e.g., users/devices) that are flagged as anomalous. The nodes each have a set of values, each value corresponding to a respective feature on the list of features. Depending on the implementation and the selected features, there are several example ways to perform the calculation of the group interest score for a group (i.e., anomalousDays). For some embodiments, the nodes are first scored based on the list of features. Specifically, each node on each feature can receive a score on the feature based on the particular value that the node has for that feature. Then, the group interest score for the group can be the sum of all the scores on each feature from all the nodes in the group.

For some features, a ranking can be first performed based on the values of the nodes. For example, for a node that has a value on a feature that has a ranking that is over 99%, the score for that node on that feature can be +2. Similarly, if a node has a value on a feature that has a ranking that exceeds 90%, then the score for that node on that feature can be +1. In the disclosed embodiments, these thresholds can be configurable. Tie breaking mechanism can also be employed, for example, by averaging the ranks of the ties. Additionally, or alternatively, for some features, multiple threshold values can be set for assigning different scores. For example, if a node has a value on a feature that is below a minimum threshold, the score on that feature for that node is zero. If the node has a value on the feature that is over a first threshold, the assigned score can be +1, and similarly, if over a second threshold, the assigned score can be +2. Similarly, the threshold values can be configurable. Further, in some examples, the scoring mechanism can include configurable weights for each feature.

At step 2020, the number of groups can be ranked based on their group interest scores. In particular, to further trimming down the data for efficiency and effectiveness, optionally the number of groups can be selected based on their group interest scores, and depending on the implementation, only a predetermined number of top ranked groups (i.e., the most interesting anomalousDays) are selected for further processing. In one implementation, finding the most interesting anomalousDays can include performing a normalization (e.g., z-score transformation) on the feature raw values, and then performing a clustering (e.g., k-means) on the groups. Based on some sample data, using a relatively small number of clusters (e.g., 10-15) may result in at least 60-70% of the anomalies falling in 1-2 large clusters, and the rest of the anomalies in smaller clusters. This may help the security platform detect cases where there are multiple interlinked low risk days. Note that, it is observed in a number of cases that the smaller clusters may correlate to groups with higher scores, while the large clusters containing groups with low scores. In an alternative and simpler implementation, a threshold can be implemented so as to select the groups that have scores exceeding the threshold.

Referring back to FIG. 19, at step 1930, links between groups (e.g., the "interesting" anomalousDays found in the process described above) are constructed to form connected components. Specifically, as in graph theory, a connected component (hereinafter "formed component," or simply "component") of an undirected graph is a subgraph (1) in which any two vertices (e.g., nodes) are connected to each other by links, and (2) which is connected to no additional vertices in the supergraph. The connected components may be formed by performing computation on the graph using known algorithms (e.g., by either breadth-first search or depth-first search, which can compute the connected components of a graph in linear time (in terms of the numbers of the vertices and edges of the graph)). Similar to what described above with respect to relationship graphs (e.g., event-specific graphs or the composite relationship graph), each link that connects between the groups represents a relationship between the nodes in those groups as established by an activity recorded in the batch of events.

Figure 21:
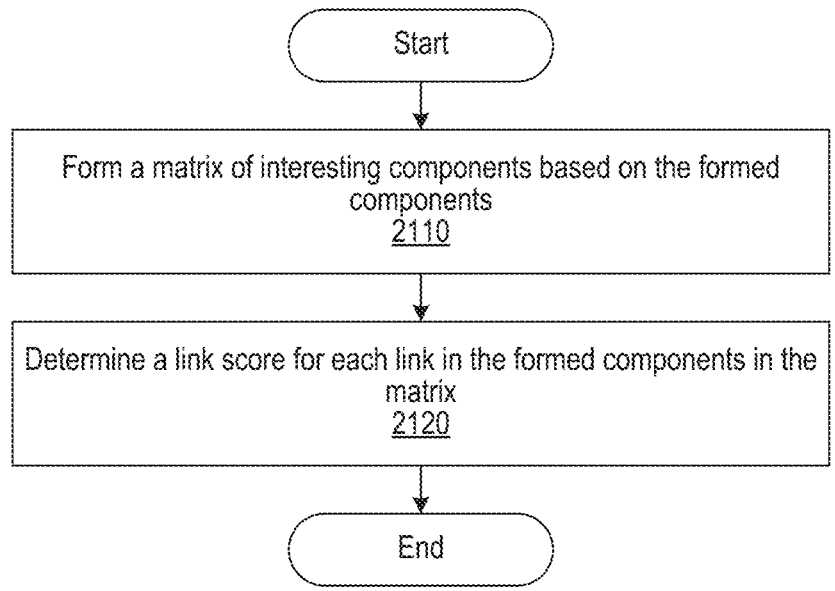
FIG. 21 illustrates a sample process of determining a link score for a particular link in a component.

Next, before step 1940, a link score can be generated for each of the links between the groups. Specifically, a link score for each link in the formed components is calculated. Like the group interest score, this step can be performed to further siphon the data so as to find the group that generates enough interest for purposes of anomaly and threat detection. A sample process of determining a link score for a particular link in a component is illustrated in FIG. 21. At step 2110, a matrix of the groups (e.g., the most interesting anomalousDays, selected above) can be built. Each chain of nodes linked at step 1930 forms a component of the matrix.

At step 2120, a link score for each link in the formed components is calculated. Specifically, one of the main purposes of computing a score for each link between two anomalousDays is to assign a higher score for the more interesting links. An example link scoring mechanism can be designed to reflect the number of common entities between the two groups (e.g., anomalousDays). In some examples, the scoring mechanism can factor in a decay for distance in time between the two groups. Additional adjustment can be made to the score based on other suitable factors. For example, when each node on a link has an anomaly score (e.g., from process 1200) that is above a threshold (e.g., 8), then the link's score can be further increased by 1 or another suitable number. In another example, if both nodes of a link have a common anomaly category, the link's score is increased. After links between the groups being scored, in some embodiments, the links with scores that are below a certain threshold are ignored, so as to allow the analytic engine to more efficiently focus on anomaly patterns that are more of interest.

Figure 23:
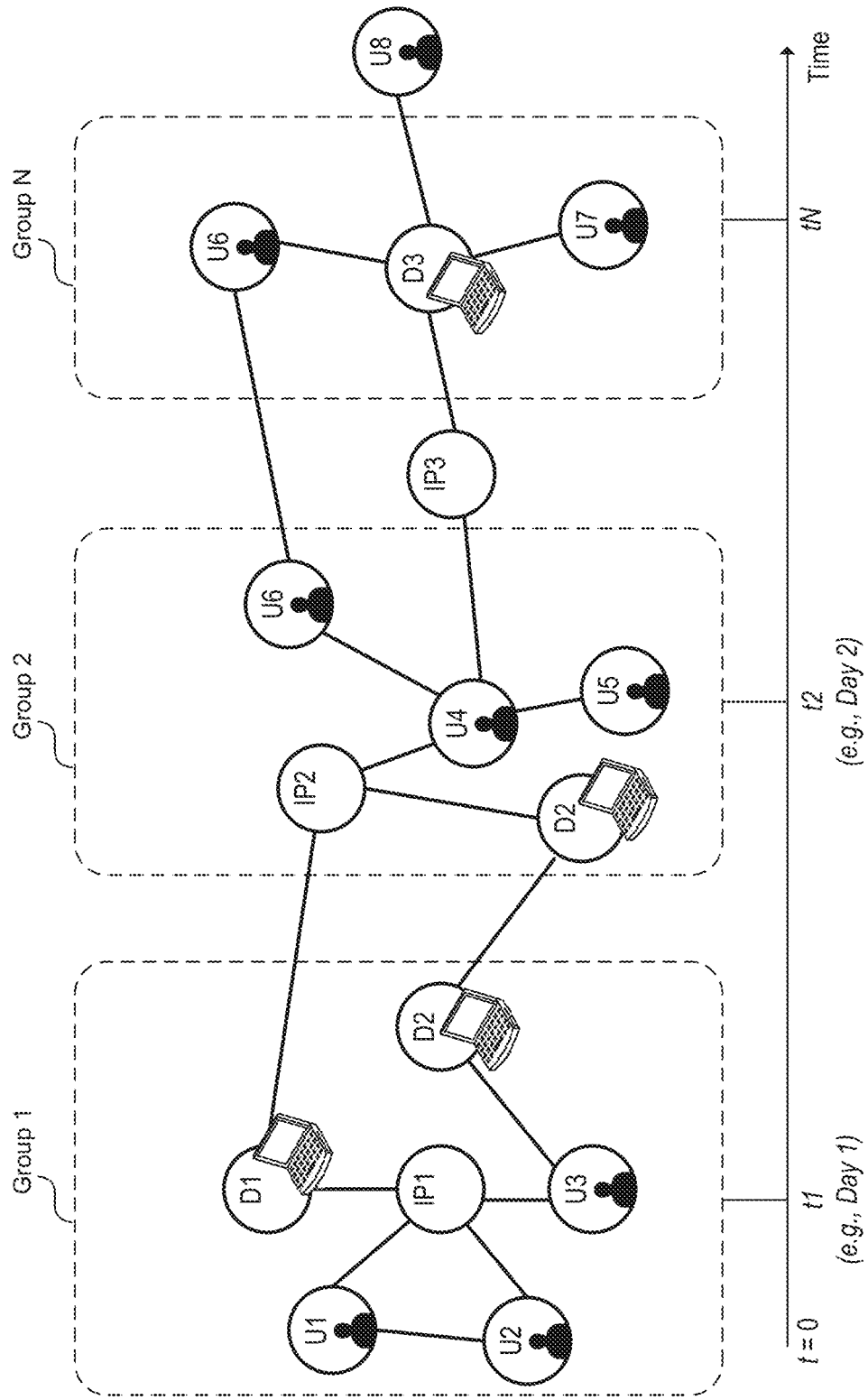
FIG. 23 illustrates a high-level diagram showing a new graph built based on components and their corresponding groups.

With the components formed, a new graph can be built based on the formed components and their corresponding groups. Note that, even though being a "new graph," the nodes in the new graph are still logically coupled to underlying events, similar to the composite relationship graph or projections thereof (discussed above). In this way, upon request (e.g., from a system administrator), the underlying events can be produced and presented as supporting evidence. A high-level diagram illustrating a new graph built based on components and their corresponding groups in illustrated in FIG. 23.

At step 1940, a total interest score is computed for each of the components formed above. The total interest score is to reflect a totality of interest generated from all nodes attached to a given link. According to one or more embodiments, the total interest scoring mechanism for the components is the sum of all the nodes' scores in each component. Depending on the implementation, some embodiments may only consider the anomaly scores in all the nodes for each component for the total interest score for the component, and do not consider group interest scores or link scores. Considering only the nodes' anomaly score can simplify the calculation when facing a large amount of data, and in those embodiments, the group interest scores and the link scores are mainly performed for purposes of filtering data and selecting the most interesting cases. In addition or as an alternative to the above embodiments, the total interest score for a formed component can include or factor in the group interest score of the groups to which the nodes in the formed component belong. In a similar manner, the total interest score for the formed component can include or factor in the link score of the link that connects the nodes in the formed component.

Figure 22:
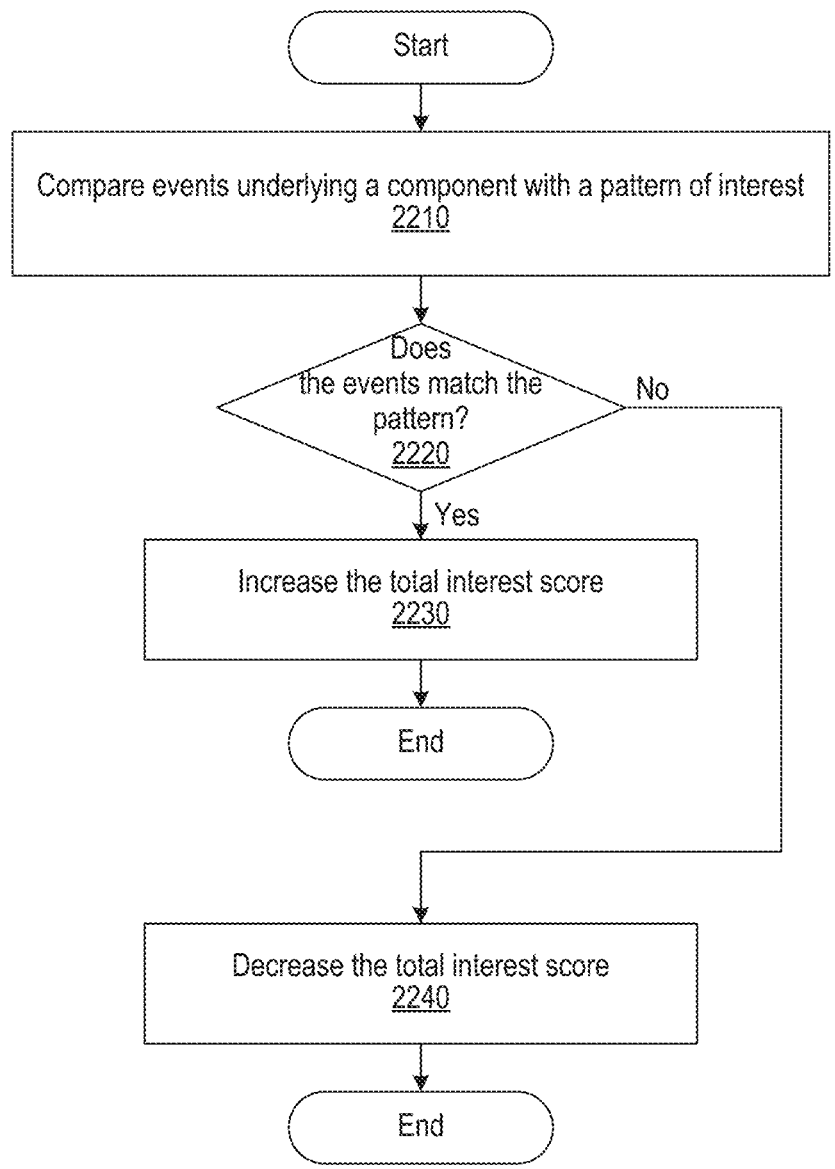
FIG. 22 illustrates a sample process of adjusting a total interest score for a component.

At step 1950, after calculating the total interest score for each of the formed components, the total interest score is adjusted. A sample process of such total interest score adjustment is illustrated FIG. 22.

More specifically, at step 2210, the adjustment of a component's total interest score can be based on comparing events underlying a component with a pattern of interest. The pattern of interest is to identify an expected temporal order and/or logical relationship in underlying events for such component to be of interest, or more simply put, patterns are the temporal or logical sequences of anomaly categories that are expected in cyber-attacks. For example, a pattern of "account takeover," followed by an "exfiltration" anomaly would warrant a raised alert level because the pattern tells a logic story that implies a causal relationship: the exfiltration (e.g., transferring a large number of files to external networks) might be a direct result of the account takeover. As a counter example, a revised pattern (or "anti-pattern") of an "exfiltration" taking place before an "account takeover" should not raise as much of an alert as the pattern mentioned above, because it is less likely that there is a causal relationship between the two anomalous events. In a similar vein, a "malware installation" followed by a "beacon anomaly" would trigger high interest, while the reverse would not.

As such, at step 2220, a comparison of events underlying a component against a pattern of interest is performed. Depending on the embodiment, the pattern of interest may include definitions for a sequence associated with an anomaly, an anti-sequence associated with an anomaly, or both. For each connected component, the analytic engine attempts to find patterns and/or anti-patterns based on the security knowledge encoded in the pattern of interest. When it is determined that the events match the pattern of interest, at step 2230, the total interest score increases accordingly. In some examples, the total interest score for a formed component increases exponentially when the events underlying the formed component matches the pattern of interest. For example, for each pattern found, the total interest score can be multiplied by a factor (e.g., 2).

Conversely, when it is determined that the events do not match the pattern of interest, at step 2240, the score may decrease accordingly; or, as an alternative, upon a mismatch, the score can remain the same depending on the implementation and what type of pattern is not matched. In the embodiments where the score is decreased, the total interest score for a formed component may decrease exponentially when the events underlying the formed component mismatches the pattern of interest. Additionally, or alternatively, the total interest score for a formed component decreases exponentially whenever the events underlying the formed component matches the anti-sequence. For example, for each anti-pattern found (or pattern mismatch, depending on the embodiment), the total interest score can be divided by a factor (e.g., 2).

Thereafter, additional filtering can be performed on the connected components. For example, some embodiments provide that "singletons" (e.g., a component with a single day) with low anomaly counts can be ignored. The threshold defining what constitutes as low can be configurable. In other examples, components with anti-patterns can be configured to be completely ignored.

At step 1960, components with adjusted total interest scores that exceed a certain threshold are identified as threats. For some embodiments, each connected component becomes a "threat." In various embodiments, the threat score assigned to the component is the component score, which may be scaled in 1-10. In certain embodiments, each component can be labeled or named based on the categories of the anomalies found in the component to allow the network administrator to have better identification and straightforward understanding of the identified threat (e.g., "beaconing+infection," or "lateral movement+exfiltration"). Supporting evidence can also be produced and presented, which may include the score of each group (e.g., each day) and the breakdown of features values for each day. In addition, the feature breakdown of the links between the days in the connected component can also be produced.

At step 1970, after identifying actionable threats, a network security related action can be performed on the identified threat. For example, the threats detected may be employed to automatically trigger an action, such as stopping the intrusion, shutting down network access, locking out users, preventing information theft or information transfer, shutting down software and or hardware processes, and the like. In certain embodiments, the discovered anomalies and threats may be presented to a network operator (e.g., a network security administrator or analyst) for decision. As an alternative or in addition to automatically taking action based on the discovered anomalies and threats, the decisions by the user (e.g., that the anomalies and threats are correctly diagnosed, or that the discovered anomalies and threats are false positives) can then be provided as feedback data in order to update and improve the models.

Overall, the processes introduced in FIGS. 19-22 can reveal "threats" that are essentially an interesting complex pattern of anomalies. The features are geared toward representing risk, and since some of the features are scored based on ranks, the score reflects relatively risk. This correlation can help the security platform detect cases where there are multiple interlinked low risk days. As such, the embodiments introduced with respect to FIGS. 19-22 are particularly advantageous in detecting patterns of risky activity that spans across multiple days and/or multiple entities (e.g., users or devices).

Computer System Device Architecture

Techniques described above can be implemented using one or more conventional physical processing devices. FIG. 24 is a block diagram showing an example of such a processing device, e.g., a computer system 2400. Multiple instances of such a computer system may be used to implement the security platform in a given embodiment.

In an illustrative embodiment, computer system 2400 includes one or more processor(s) 2410, memory 2420, one or more input/output (I/O) devices 2430, a network adapter 2440, and a storage adapter 2450, all interconnected by an interconnect 2460. Memory 2420 includes storage locations that are addressable by processor(s) 2410 and adapters 2440 and 2450 for storing software program code and data structures associated with the techniques introduced here. Memory 2420 may include multiple physically distinct memory devices, which may be all of the same type or of different types (e.g., volatile memory such as SRAM or DRAM, non-volatile memory such as flash, etc.). Processor(s) 2410 and adapters 2440 and 2450 may, in turn, include processing elements or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 2440 includes one or more ports to couple computer system 2400 with one or more other devices over one or more point-to-point links, local area networks (LANs), wide area networks (WANs), the global Internet, virtual private networks (VPNs) implemented over a public network, or the like. Network adapter 2440 can include the mechanical components and electrical circuitry needed to connect storage server 2400 to a network. One or more systems can communicate with other systems over the network by exchanging packets or frames of data according to pre-defined protocols, such as TCP/IP.

Storage adapter 2450 interfaces with an operating system running on processor(s) 8510 to access information on attached storage devices. The information may be stored on any type of attached array of writable storage media, such as hard disk drives, magnetic tape, optical disk, flash memory, solid-state drives, RAM, MEMs or any other similar media adapted to store information. Storage adapter 2450 includes a plurality of ports having I/O interface circuitry that couples with disks or other storage related devices over an I/O interconnect arrangement.

Embodiments of the techniques introduced here include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, or firmware.

Embodiments of the techniques introduced here may be implemented, at least in part, by a computer program product which may include a non-transitory machine-readable medium having stored thereon instructions that may be used to program/configure a computer or other electronic device to perform some or all of the operations described above. The machine-readable medium may include, for example, magnetic hard disk drives, compact disc read-only memories (CD-ROMs), magneto-optical disks, floppy disks, ROMs, RAMs, various forms of erasable programmable read-only memories (EPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

What is claimed is:

1. A method comprising:
   accessing a relationship graph in which entities associated with an information technology network are represented as nodes and relationships among the nodes are represented as links;
   assigning the nodes in the relationship graph to groups to form a plurality of groups, each group of the plurality of groups including nodes associated with activities that occurred within a same unit of time;
   constructing links between nodes across different groups of the plurality of groups, to form a chain of linked nodes, the chain of linked nodes forming a component;
   computing a score for the component, wherein the score is indicative of a level of interest associated with nodes attached to a given link, and wherein each node had been assigned an anomaly score from a previous data analytic stage;
   identifying the component for security scrutiny based on the computed score; and
   performing a network security related action on the identified component.

2. The method of claim 1, further comprising:
   adjusting the score for the component based on comparing events underlying the component with a pattern of interest, wherein the pattern of interest identifies an expected temporal order and/or logical relationship in underlying events for the component to be of interest.

3. The method of claim 2, wherein the compared events comprise events that have been earmarked as anomalies, and wherein each node is assigned an anomaly score from a previous data analytic stage.

4. The method of claim 1, wherein the relationship graph is a subset of a composite relationship graph that includes edges representing a plurality of anomalous activities conducted by entities.

5. The method of claim 1, further comprising:
   determining a link score for the component.

6. The method of claim 1, further comprising:
   determining a link score for each link in the component, based on a number of common nodes between the groups with which the component is associated.

7. The method of claim 1, further comprising:
   determining a link score for the component, based on a distance in time between the groups with which the component is associated.

8. The method of claim 1, further comprising:
   determining a link score for the component, based on an anomaly score of each node in the component.

9. The method of claim 1, further comprising:
   determining a link score for each link in the component, wherein the score for the component is based on the link score of the link that connects the nodes in the component.

10. The method of claim 1, further comprising: creating a new graph using the component.

11. The method of claim 1, further comprising:
    creating a new graph using the component, wherein the new graph includes nodes with respective links and a corresponding group, and wherein the nodes in the new graph are coupled to underlying events so that, responsive to a request, the underlying events are output as supporting evidence.

12. The method of claim 1, further comprising:
    before assigning the nodes in the relationship graph to groups, filtering the nodes and links in the relationship graph by removing nodes that include a whitelisted entity.

13. The method of claim 1, further comprising:
    before assigning the nodes in the relationship graph to groups, filtering the nodes and links in the relationship graph by removing nodes that include an entity having more than a threshold number of anomaly links to other entities.

14. A computer system comprising:
    a processor; and
    a communication device, operatively coupled to the processor, through which to receive event data indicative of activity of entities associated with an information technology network;
    wherein the processor is configured to perform operations including:
       accessing a relationship graph in which the entities associated with the information technology network are represented as nodes and relationships among the nodes are represented as links;
       assigning the nodes in the relationship graph to groups to form a plurality of groups, each group of the plurality of groups including nodes associated with activities that occurred within a same unit of time;
       constructing links between nodes across different groups of the plurality of groups, to form a chain of linked nodes, the chain of linked nodes forming a component;
       computing a score for the component, wherein the score is indicative of a level of interest associated with nodes attached to a given link, and wherein each node had been assigned an anomaly score from a previous data analytic stage;

identifying the component for security scrutiny based on the computed score; and performing a network security related action on the identified component.

15. The computer system of claim 14, wherein said operations further include:

adjusting the score for the component based on comparing events underlying the component with a pattern of interest, wherein the pattern of interest identifies an expected temporal order and/or logical relationship in underlying events for the component to be of interest.

16. The computer system of claim 15, wherein the compared events that have been earmarked as anomalies, and wherein each node is assigned an anomaly score from a previous data analytic stage.

17. A non-transitory machine-readable storage medium for use in a processing system, the non-transitory machine-readable storage medium storing instructions, execution of which in the processing system causes the processing system to perform operations comprising:

accessing a relationship graph in which entities associated with an information technology network are represented as nodes and relationships among the nodes are represented as links;

assigning the nodes in the relationship graph to groups to form a plurality of groups, each group of the plurality of groups including nodes associated with activities that occurred within a same unit of time;

constructing links between nodes across different groups of the plurality of groups, to form a chain of linked nodes, the chain of linked nodes forming a component;

computing a score for the component, wherein the score is indicative of a level of interest associated with nodes attached to a given link, and wherein each node had been assigned an anomaly score from a previous data analytic stage;

identifying the component for security scrutiny based on the computed score; and performing a network security related action on the identified component.

18. The non-transitory machine-readable storage medium of claim 17, said operations further including:

determining a link score for the component.

19. The non-transitory machine-readable storage medium of claim 17, said operations further including:

determining a link score for each link in the component, based on a number of common nodes between the groups with which the component is associated.

20. The non-transitory machine-readable storage medium of claim 17, further comprising:

determining a link score for the component, based on an anomaly score of each node in the component.

* * * * *